US011662242B2

(12) United States Patent
Allen

(10) Patent No.: US 11,662,242 B2
(45) Date of Patent: May 30, 2023

(54) FLOW SENSOR GAUGE

(71) Applicant: Rain Bird Corporation, Azusa, CA (US)

(72) Inventor: Kirk Andrew Allen, Valencia, CA (US)

(73) Assignee: Rain Bird Corporation, Azusa, CA (US)

( * ) Notice: Subject to any disclaimer, the term of this patent is extended or adjusted under 35 U.S.C. 154(b) by 670 days.

(21) Appl. No.: 16/729,083

(22) Filed: Dec. 27, 2019

(65) Prior Publication Data

US 2020/0209040 A1 Jul. 2, 2020

Related U.S. Application Data

(60) Provisional application No. 62/786,822, filed on Dec. 31, 2018.

(51) Int. Cl.
*G01F 23/02* (2006.01)
*G01F 1/80* (2006.01)
*G01D 5/42* (2006.01)

(52) U.S. Cl.
CPC .......... *G01F 23/02* (2013.01); *G01F 1/80* (2013.01); *G01D 5/42* (2013.01)

(58) Field of Classification Search
CPC ........ G01D 13/06; G01D 13/08; G01D 13/10; G01F 15/06; G01F 23/02
See application file for complete search history.

(56) References Cited

U.S. PATENT DOCUMENTS

| 483,552 A | 10/1892 | Goodell |
| 1,035,225 A | 8/1912 | Nuebling |
| 2,674,880 A | 4/1954 | Broderson |
| 2,981,240 A | 4/1961 | Nelson |
| 3,076,335 A | 2/1963 | Rosaen |
| 3,076,336 A | 2/1963 | Rosaen |
| 3,085,423 A | 4/1963 | Champion |

(Continued)

FOREIGN PATENT DOCUMENTS

| CN | 1816735 | 8/2006 |
| EP | 0188131 | 7/1986 |

(Continued)

OTHER PUBLICATIONS

USPTO; U.S. Appl. No. 16/858,159; Office Action dated Oct. 14, 2020; (pp. 1-14).

(Continued)

*Primary Examiner* — John Fitzgerald
(74) *Attorney, Agent, or Firm* — Fitch, Even, Tabin & Flannery, LLP

(57) ABSTRACT

Flow sensors are provided that can monitor flow conditions. The flow sensor includes a gauge that provides a first level of information about flow through the sensor, and an indicator associated with the gauge that can provided a second level of information about flow through the sensor. The indicator might be in the form of a dial that can rotate about the gauge and might include a locked position for monitoring flow and an unlocked position to rotate the dial about the gauge to reposition the dial. A twisted shaft with varying twist rate is provided to convert linear motion to rotational motion for the gauge.

7 Claims, 30 Drawing Sheets

(56) References Cited

U.S. PATENT DOCUMENTS

| | | |
|---|---|---|
| 3,186,597 A | 6/1965 | Henderson |
| 3,204,659 A | 9/1965 | Richards |
| 3,212,685 A | 10/1965 | Swan |
| 3,260,110 A | 7/1966 | Lutz |
| 3,354,718 A | 11/1967 | Boutillon |
| 3,357,255 A | 12/1967 | Reynolds |
| 3,472,072 A | 10/1969 | Kunstadt |
| 3,530,705 A | 9/1970 | Lathrop |
| 3,641,817 A | 2/1972 | Dory |
| 3,667,495 A | 6/1972 | Schuler |
| 3,709,037 A | 1/1973 | Abbotts |
| 3,711,689 A | 1/1973 | Park |
| 3,721,116 A | 3/1973 | Brachet |
| 3,721,505 A | 3/1973 | Garnett |
| 3,723,987 A | 3/1973 | Barone, Jr. |
| 3,757,577 A | 9/1973 | Bozek |
| 3,759,099 A | 9/1973 | McGregor |
| 3,789,664 A | 2/1974 | Bozek |
| 3,801,239 A | 4/1974 | Larson |
| 3,807,220 A | 4/1974 | Ottenstein |
| 3,812,715 A | 5/1974 | Whalen |
| 3,822,591 A | 7/1974 | Li |
| 3,842,671 A | 10/1974 | Frizelle |
| 3,853,144 A | 12/1974 | Whelan |
| 3,857,277 A | 12/1974 | Moore |
| 3,874,235 A | 4/1975 | Sanden |
| 3,882,723 A | 5/1975 | Wickham |
| 3,948,083 A | 4/1976 | Wickham |
| 3,955,415 A | 5/1976 | Sharon |
| 3,975,943 A | 8/1976 | Brachet |
| 3,979,955 A | 9/1976 | Schulte |
| 3,987,662 A | 10/1976 | Hara |
| 3,990,299 A | 11/1976 | Coffman |
| 4,089,215 A | 5/1978 | Chapin |
| 4,195,518 A | 4/1980 | Fees |
| 4,250,553 A | 2/1981 | Sebens |
| 4,254,664 A | 3/1981 | Graham |
| 4,282,761 A | 8/1981 | Rosaen |
| 4,292,853 A | 10/1981 | Williams |
| 4,305,281 A | 12/1981 | Lee |
| 4,308,746 A | 1/1982 | Covington |
| 4,311,170 A | 1/1982 | Dolan |
| 4,337,786 A | 7/1982 | Myers |
| 4,361,030 A | 11/1982 | Heide |
| 4,368,646 A | 1/1983 | Rogg |
| 4,388,835 A | 6/1983 | Rosaen |
| 4,440,028 A | 4/1984 | Ramlow |
| 4,501,158 A | 2/1985 | Pelikan |
| 4,501,972 A | 2/1985 | Foerster, Jr. |
| 4,518,955 A | 5/1985 | Meyer |
| 4,530,463 A | 7/1985 | Hiniker |
| 4,548,076 A | 10/1985 | Haake |
| 4,581,946 A | 4/1986 | Kanayama |
| 4,590,805 A | 5/1986 | Baird |
| 4,619,139 A | 10/1986 | Rosaen |
| 4,630,486 A | 12/1986 | Miles |
| 4,630,488 A | 12/1986 | Marlier |
| 4,635,485 A | 1/1987 | Lew |
| 4,637,547 A | 1/1987 | Hiniker |
| 4,643,213 A | 2/1987 | Mirel |
| 4,651,286 A | 3/1987 | Fukai |
| 4,724,706 A | 2/1988 | Stiever |
| 4,729,106 A | 3/1988 | Rush |
| 4,730,637 A | 3/1988 | White |
| 4,797,666 A | 1/1989 | Baxter |
| 4,805,862 A | 2/1989 | Wissman |
| 4,838,310 A | 6/1989 | Scott |
| 4,840,072 A | 6/1989 | Cuthbert |
| 4,859,157 A | 8/1989 | Adler |
| 4,867,198 A | 9/1989 | Faust |
| 4,870,859 A | 10/1989 | Twerdochlib |
| 4,888,706 A | 12/1989 | Rush |
| 4,936,151 A | 6/1990 | Tokio |
| 4,945,771 A | 8/1990 | Ogden |
| 4,962,666 A | 10/1990 | Adney |
| 4,986,133 A | 1/1991 | Lake |
| 4,987,914 A | 1/1991 | Adney |
| 4,991,436 A | 2/1991 | Roling |
| 5,000,031 A | 3/1991 | Potvin |
| 5,004,014 A | 4/1991 | Bender |
| 5,007,453 A | 4/1991 | Berkowitz |
| 5,014,543 A | 5/1991 | Franklin |
| 5,038,268 A | 8/1991 | Krause |
| 5,040,409 A | 8/1991 | Kiewit |
| 5,046,353 A | 9/1991 | Thompson |
| 5,048,755 A | 9/1991 | Dodds |
| 5,052,212 A | 10/1991 | Cohrs |
| 5,056,554 A | 10/1991 | White |
| 5,062,442 A | 11/1991 | Stenstrom |
| 5,072,621 A | 12/1991 | Hasselmann |
| 5,085,076 A | 2/1992 | Engelmann |
| 5,086,806 A | 2/1992 | Engler |
| 5,097,861 A | 3/1992 | Hopkins |
| 5,099,698 A | 3/1992 | Kath |
| 5,138,888 A | 8/1992 | Walmer |
| 5,158,207 A | 10/1992 | Van Daele |
| 5,228,469 A | 7/1993 | Otten |
| 5,251,653 A | 10/1993 | Tucker |
| 5,261,268 A | 11/1993 | Namba |
| 5,272,646 A | 12/1993 | Farmer |
| 5,287,884 A | 2/1994 | Cohen |
| 5,303,738 A | 4/1994 | Chang |
| 5,315,862 A | 5/1994 | Hasselmann |
| 5,377,529 A | 1/1995 | Boyd |
| 5,383,338 A | 1/1995 | Bowsky |
| 5,415,041 A | 5/1995 | Foran, Jr. |
| 5,419,203 A | 5/1995 | Carmichael |
| 5,438,862 A | 8/1995 | Keating |
| 5,483,838 A | 1/1996 | Holden |
| 5,494,070 A | 2/1996 | Hilton |
| 5,515,734 A | 5/1996 | Malminen |
| 5,540,107 A | 7/1996 | Silverman |
| 5,544,533 A | 8/1996 | Sugi |
| 5,546,801 A | 8/1996 | Swinson |
| 5,554,805 A | 9/1996 | Bahrton |
| 5,568,825 A | 10/1996 | Faulk |
| 5,586,050 A | 12/1996 | Makel |
| 5,590,686 A | 1/1997 | Prendergast |
| 5,612,890 A | 3/1997 | Strasser |
| 5,616,830 A | 4/1997 | Wodeslavsky |
| 5,636,653 A | 6/1997 | Titus |
| 5,637,789 A | 6/1997 | Lawson |
| 5,650,564 A | 7/1997 | Wodeslavsky |
| 5,655,561 A | 8/1997 | Wendel |
| 5,655,568 A | 8/1997 | Bhargava |
| 5,677,501 A | 10/1997 | Kawaguchi |
| 5,698,793 A | 12/1997 | Carmichael |
| 5,708,195 A | 1/1998 | Kurisu |
| 5,713,729 A | 2/1998 | Hong |
| 5,717,137 A | 2/1998 | Singleterry |
| 5,739,420 A | 4/1998 | Peterson |
| 5,746,413 A | 5/1998 | Goloff |
| 5,769,108 A | 6/1998 | Proudman |
| 5,771,920 A | 6/1998 | Jewett |
| 5,806,558 A | 9/1998 | Greverath |
| 5,814,735 A | 9/1998 | Kurisaki |
| 5,816,246 A | 10/1998 | Mirza |
| 5,820,715 A | 10/1998 | Singleterry |
| 5,838,258 A | 11/1998 | Saar |
| 5,877,417 A | 3/1999 | Arvidson |
| 5,880,378 A | 3/1999 | Behring, II |
| 5,884,649 A | 3/1999 | Proudman |
| 5,890,515 A | 4/1999 | Spiess |
| 5,902,927 A | 5/1999 | Titus |
| 5,911,238 A | 6/1999 | Bump |
| 5,913,236 A | 6/1999 | Wodeslavsky |
| 5,918,268 A | 6/1999 | Lukas |
| 5,918,271 A | 6/1999 | McGuigan |
| 5,944,048 A | 8/1999 | Bump |
| 5,950,667 A | 9/1999 | Nicewonger |
| 5,970,801 A | 10/1999 | Ciobanu |
| 5,971,011 A | 10/1999 | Price |
| 5,975,126 A | 11/1999 | Bump |
| 5,986,573 A | 11/1999 | Franklin |

(56) References Cited

U.S. PATENT DOCUMENTS

| | | |
|---|---|---|
| 5,992,218 A | 11/1999 | Tryba |
| 6,003,549 A | 12/1999 | Delcroix |
| 6,019,003 A | 2/2000 | Wieder |
| 6,026,838 A | 2/2000 | Nicewonger |
| 6,032,540 A | 3/2000 | Hawkins |
| 6,032,541 A | 3/2000 | Haak |
| 6,041,801 A | 3/2000 | Gray |
| 6,041,807 A | 3/2000 | Honaga |
| 6,065,941 A | 5/2000 | Gray |
| 6,076,542 A | 6/2000 | Titus |
| 6,079,263 A | 6/2000 | Beddies |
| 6,079,279 A | 6/2000 | Bussow |
| 6,106,705 A | 8/2000 | Giordano |
| 6,112,579 A | 9/2000 | Tryba |
| 6,119,528 A | 9/2000 | Genack |
| 6,128,946 A | 10/2000 | Leon |
| 6,134,949 A | 10/2000 | Leon |
| 6,161,100 A | 12/2000 | Saar |
| 6,170,508 B1 | 1/2001 | Faust |
| 6,202,679 B1 | 3/2001 | Titus |
| 6,209,576 B1 | 4/2001 | Davis |
| 6,213,986 B1 | 4/2001 | Darling |
| 6,216,727 B1 | 4/2001 | Genova |
| 6,237,618 B1 | 5/2001 | Kushner |
| 6,240,336 B1 | 5/2001 | Brundisini |
| 6,240,950 B1 | 6/2001 | Harris |
| 6,244,844 B1 | 6/2001 | Diaz |
| 6,250,151 B1 | 6/2001 | Tingleff |
| 6,267,006 B1 | 7/2001 | Bugli |
| 6,284,129 B1 | 9/2001 | Giordano |
| 6,314,795 B1 | 11/2001 | Ingham |
| 6,317,051 B1 | 11/2001 | Cohen |
| 6,323,774 B1 | 11/2001 | Mitchell |
| 6,328,053 B1 | 12/2001 | Slaydon |
| 6,336,361 B1 | 1/2002 | Uramachi |
| 6,343,614 B1 | 2/2002 | Gray |
| 6,345,541 B1 | 2/2002 | Hendey |
| 6,377,190 B1 | 4/2002 | Saar |
| 6,402,048 B1 | 6/2002 | Collins |
| 6,460,565 B1 | 10/2002 | Titus |
| 6,485,263 B1 | 11/2002 | Bryant |
| 6,489,895 B1 | 12/2002 | Apelman |
| 6,491,062 B1 | 12/2002 | Croft |
| 6,502,451 B1 | 1/2003 | Fourie |
| 6,502,602 B1 | 1/2003 | Stroup |
| 6,513,375 B2 | 2/2003 | Uramachi |
| 6,513,542 B1 | 2/2003 | Hsieh |
| 6,517,707 B2 | 2/2003 | Giordano |
| 6,520,003 B1 | 2/2003 | Fox |
| 6,520,747 B2 | 2/2003 | Gray |
| 6,530,262 B1 | 3/2003 | Esser |
| 6,535,827 B1 | 3/2003 | Lestina |
| 6,539,814 B1 | 4/2003 | Popp |
| 6,552,647 B1 | 4/2003 | Thiessen |
| 6,568,416 B2 | 5/2003 | Tucker |
| 6,591,694 B2 | 7/2003 | Tsai |
| 6,626,042 B2 | 9/2003 | Havlena |
| 6,648,240 B2 | 11/2003 | Simmons |
| 6,654,697 B1 | 11/2003 | Eryurek |
| 6,666,384 B2 | 12/2003 | Prandi |
| 6,688,535 B2 | 2/2004 | Collins |
| 6,691,924 B1 | 2/2004 | Vestergaard |
| 6,694,824 B2 | 2/2004 | Shinmura |
| 6,705,489 B2 | 3/2004 | Henry |
| 6,729,182 B2 | 5/2004 | Uramachi |
| 6,758,104 B2 | 7/2004 | Leys |
| 6,766,835 B1 | 7/2004 | Fima |
| 6,782,311 B2 | 8/2004 | Barlow |
| 6,792,799 B2 | 9/2004 | Ford |
| 6,796,173 B1 | 9/2004 | Lajoie |
| 6,807,855 B2 | 10/2004 | Stroup |
| 6,812,848 B2 | 11/2004 | Candela |
| 6,819,292 B2 | 11/2004 | Winter |
| 6,830,064 B2 | 12/2004 | Ji |
| 6,832,625 B2 | 12/2004 | Ford |
| 6,842,706 B1 | 1/2005 | Baraty |
| 6,845,886 B2 | 1/2005 | Henry |
| 6,857,308 B2 | 2/2005 | Johnson |
| 6,892,113 B1 | 5/2005 | Addink |
| 6,895,995 B2 | 5/2005 | Kirkman |
| 6,907,383 B2 | 6/2005 | Eryurek |
| 6,920,778 B2 | 7/2005 | Koike |
| 6,926,821 B2 | 8/2005 | Giordano |
| 6,931,305 B2 | 8/2005 | Sherwood |
| 6,939,470 B2 | 9/2005 | Baarman |
| 6,954,178 B2 | 10/2005 | Winter |
| 6,957,157 B2 | 10/2005 | Lander |
| 6,959,611 B2 | 11/2005 | Schehl |
| 6,963,808 B1 | 11/2005 | Addink |
| 6,968,856 B1 | 11/2005 | Goza |
| 6,970,808 B2 | 11/2005 | Abhulimen |
| 6,971,625 B2 | 12/2005 | Szymaszek |
| 6,973,373 B2 | 12/2005 | Gray |
| 6,973,705 B2 | 12/2005 | Leys |
| 6,973,827 B2 | 12/2005 | Koike |
| 6,988,419 B2 | 1/2006 | Muller |
| 7,028,533 B2 | 4/2006 | Koike |
| 7,030,767 B2 | 4/2006 | Candela |
| 7,032,435 B2 | 4/2006 | Hassenflug |
| 7,032,610 B2 | 4/2006 | Matsuo |
| 7,050,887 B2 | 5/2006 | Alvarez |
| 7,069,944 B2 | 7/2006 | Morikawa |
| 7,097,113 B2 | 8/2006 | Ivans |
| 7,107,128 B2 | 9/2006 | Laverdiere |
| 7,114,516 B2 | 10/2006 | Ito |
| 7,121,477 B1 | 10/2006 | Noelke |
| 7,126,551 B2 | 10/2006 | Winter |
| 7,130,750 B1 | 10/2006 | Stevens |
| 7,150,201 B2 | 12/2006 | Tison |
| 7,174,771 B2 | 2/2007 | Cooper |
| 7,174,772 B2 | 2/2007 | Sacca |
| 7,191,955 B2 | 3/2007 | Ivans |
| 7,193,233 B2 | 3/2007 | Smith |
| 7,201,180 B2 | 4/2007 | Ephrat |
| 7,218,237 B2 | 5/2007 | Kates |
| 7,228,726 B2 | 6/2007 | Kates |
| 7,233,252 B1 | 6/2007 | Hardin |
| 7,254,518 B2 | 8/2007 | Eryurek |
| 7,287,434 B2 | 10/2007 | Tison |
| 7,290,680 B2 | 11/2007 | Henry |
| 7,306,008 B2 | 12/2007 | Tornay |
| 7,308,824 B2 | 12/2007 | Trescott |
| 7,311,005 B2 | 12/2007 | Wiesinger |
| 7,317,971 B2 | 1/2008 | Laverdiere |
| 7,322,231 B2 | 1/2008 | Trygg |
| 7,330,796 B2 | 2/2008 | Addink |
| 7,334,455 B2 | 2/2008 | Yanagi |
| 7,343,795 B2 | 3/2008 | Winter |
| 7,346,434 B2 | 3/2008 | Goza |
| 7,349,763 B2 | 3/2008 | Ivans |
| 7,349,813 B2 | 3/2008 | Gutierrez |
| 7,360,413 B2 | 4/2008 | Jeffries |
| 7,366,625 B1 | 4/2008 | Augenstein |
| 7,377,184 B1 | 5/2008 | Schlachter |
| 7,383,721 B2 | 6/2008 | Parsons |
| 7,392,817 B2 | 7/2008 | Burlage |
| 7,395,708 B2 | 7/2008 | Kirchner |
| 7,404,686 B2 * | 7/2008 | Volum ............... F16L 37/098 403/109.8 |
| 7,412,876 B2 | 8/2008 | Kates |
| 7,444,886 B2 | 11/2008 | Furkert |
| 7,451,777 B2 | 11/2008 | Burlage |
| 7,458,521 B2 | 12/2008 | Ivans |
| 7,475,863 B2 | 1/2009 | Donovan |
| 7,480,544 B2 | 1/2009 | Wang |
| 7,491,320 B2 | 2/2009 | Gross |
| 7,494,070 B2 | 2/2009 | Collins |
| 7,536,900 B2 | 5/2009 | Nakamura |
| 7,546,181 B2 | 6/2009 | Vidovich |
| 7,546,778 B2 | 6/2009 | Amante |
| 7,549,348 B2 | 6/2009 | Brown |
| 7,549,439 B2 | 6/2009 | Kimura |
| 7,561,057 B2 | 7/2009 | Kates |
| 7,574,896 B1 | 8/2009 | Cooper |

(56) References Cited

U.S. PATENT DOCUMENTS

| | | |
|---|---|---|
| 7,583,198 B2 | 9/2009 | Kates |
| 7,596,429 B2 | 9/2009 | Cardinal |
| 7,596,458 B2 | 9/2009 | Lander |
| 7,617,992 B2 | 11/2009 | Ivans |
| 7,637,152 B2 | 12/2009 | Ushigusa |
| 7,658,105 B2 | 2/2010 | Holz |
| 7,668,670 B2 | 2/2010 | Lander |
| 7,669,461 B2 | 3/2010 | Kates |
| 7,669,594 B2 | 3/2010 | Downie |
| 7,685,866 B2 | 3/2010 | Bierbaum |
| 7,693,606 B2 | 4/2010 | Ahmad |
| 7,708,206 B2 | 5/2010 | Ivans |
| 7,711,454 B2 | 5/2010 | Addink |
| 7,711,651 B2 | 5/2010 | Baraty |
| 7,723,860 B2 | 5/2010 | Nagler |
| 7,729,993 B2 | 6/2010 | Baraty |
| 7,742,862 B2 | 6/2010 | Anderson |
| 7,774,282 B2 | 8/2010 | Baraty |
| 7,779,852 B2 | 8/2010 | Burlage |
| 7,819,020 B2 | 10/2010 | Jacobi |
| 7,822,511 B2 | 10/2010 | Ivans |
| 7,841,229 B2 | 11/2010 | Ridgway |
| 7,852,487 B2 | 12/2010 | Rembe |
| 7,856,864 B2 | 12/2010 | McEwan |
| 7,861,740 B2 | 1/2011 | Phallen |
| 7,891,246 B2 | 2/2011 | Lander |
| 7,899,580 B2 | 3/2011 | Cardinal |
| 7,900,647 B2 | 3/2011 | Tornay |
| 7,920,983 B1 | 4/2011 | Peleg |
| 7,930,069 B2 | 4/2011 | Savelle |
| 7,930,085 B2 | 4/2011 | Anderson |
| 7,940,189 B2 | 5/2011 | Brown |
| 7,944,363 B2 | 5/2011 | Kim |
| 7,949,495 B2 | 5/2011 | Wiklund |
| 7,966,099 B2 | 6/2011 | Fima |
| 7,969,318 B2 | 6/2011 | White |
| 7,970,494 B2 | 6/2011 | Fima |
| 7,994,927 B2 | 8/2011 | Atassi |
| 8,020,585 B2 | 9/2011 | Shock |
| 8,072,340 B2 | 12/2011 | Yukawa |
| 8,082,066 B2 | 12/2011 | Laverdiere |
| 8,104,340 B2 | 1/2012 | Speldrich |
| 8,109,131 B2 | 2/2012 | Winter |
| 8,130,107 B2 | 3/2012 | Meyer |
| 8,145,359 B2 | 3/2012 | Addink |
| RE43,334 E | 5/2012 | Simmons |
| 8,172,200 B2 | 5/2012 | Kroemmer |
| 8,174,398 B2 | 5/2012 | Wien |
| 8,175,752 B2 | 5/2012 | Deivasigamani |
| 8,193,942 B2 | 6/2012 | White |
| 8,205,508 B2 | 6/2012 | Healey |
| 8,205,632 B2 | 6/2012 | Fishwick |
| 8,256,304 B2 | 9/2012 | Therrian |
| 8,256,744 B2 | 9/2012 | Tanikawa |
| 8,265,887 B2 | 9/2012 | Itou |
| 8,271,143 B2 | 9/2012 | Deivasigamani |
| 8,301,309 B1 | 10/2012 | Woytoxitz |
| 8,308,857 B2 | 11/2012 | Couillard |
| 8,316,695 B2 | 11/2012 | Jarvie |
| 8,332,130 B2 | 12/2012 | Stretch |
| 8,336,544 B2 | 12/2012 | Downie |
| 8,353,221 B2 | 1/2013 | Schmid |
| 8,365,753 B2 | 2/2013 | Dana |
| 8,380,448 B2 | 2/2013 | Franklin |
| 8,434,634 B2 | 5/2013 | Bork |
| 8,439,068 B2 | 5/2013 | Croibier |
| 8,441,361 B2 | 5/2013 | McAlister |
| 8,443,822 B2 | 5/2013 | Ivans |
| 8,443,823 B1 | 5/2013 | Prager |
| 8,457,908 B2 | 6/2013 | Patel |
| 8,464,582 B2 | 6/2013 | Roux |
| 8,498,523 B2 | 7/2013 | Deivasigamani |
| 8,499,616 B2 | 8/2013 | Stoner |
| 8,504,318 B2 | 8/2013 | Mendelson |
| 8,517,051 B2 | 8/2013 | Fazekas |
| 8,531,303 B2 | 9/2013 | Pham |
| 8,548,632 B1 | 10/2013 | Porter |
| 8,561,636 B2 | 10/2013 | Eithun |
| 8,590,395 B2 | 11/2013 | Ge |
| 8,600,569 B2 | 12/2013 | Woytowitz |
| 8,606,413 B2 | 12/2013 | Picton |
| 8,607,645 B2 | 12/2013 | Laubach |
| 8,616,234 B2 | 12/2013 | Ringer |
| 8,618,941 B2 | 12/2013 | Javey |
| 8,649,907 B2 | 2/2014 | Ersavas |
| 8,662,005 B2 | 3/2014 | Chen |
| 8,666,683 B2 | 3/2014 | Rogers |
| 8,667,978 B2 | 3/2014 | Ford |
| 8,668,830 B2 | 3/2014 | Soecknick |
| 8,717,183 B2 | 5/2014 | Pal |
| 8,719,187 B2 | 5/2014 | Milanes Garcia-Moreno |
| 8,720,481 B2 | 5/2014 | Guy |
| 8,727,604 B2 | 5/2014 | Compton |
| 8,749,393 B1 | 6/2014 | Tollefson |
| 8,756,022 B2 | 6/2014 | Franklin |
| 8,793,024 B1 | 7/2014 | Woytowitz |
| 8,800,384 B2 | 8/2014 | Wootten |
| 8,800,473 B1 | 8/2014 | DeVerse |
| 8,816,866 B2 | 8/2014 | Day |
| 8,831,024 B2 | 9/2014 | Robinson |
| 8,833,384 B2 | 9/2014 | Burt |
| 8,833,405 B2 | 9/2014 | Phallen |
| 8,834,134 B2 | 9/2014 | Baker |
| 8,844,835 B2 | 9/2014 | Ford |
| 8,849,461 B2 | 9/2014 | Ersavas |
| 8,850,871 B2 | 10/2014 | Schaefer |
| 8,850,872 B2 | 10/2014 | Jarvie |
| 8,857,466 B1 | 10/2014 | Wilson |
| 8,866,634 B2 | 10/2014 | Williamson |
| 8,905,062 B2 | 12/2014 | Menet |
| 8,910,887 B2 | 12/2014 | Helmsderfer |
| 8,918,293 B2 | 12/2014 | Carmichael |
| 8,931,330 B2 | 1/2015 | Lucente |
| 8,948,979 B2 | 2/2015 | Malsam |
| 8,950,249 B2 | 2/2015 | Stoner |
| 8,965,584 B2 | 2/2015 | Deivasigamani |
| 9,010,360 B1 | 4/2015 | Older |
| 9,019,120 B2 | 4/2015 | Broniak |
| 9,032,998 B2 | 5/2015 | O'Brien |
| 9,037,422 B2 | 5/2015 | McHugh |
| 9,062,895 B2 | 6/2015 | Deivasigamani |
| 9,081,389 B2 | 7/2015 | Foster |
| 9,120,116 B2 | 9/2015 | Gorman |
| 9,140,255 B2 | 9/2015 | Wetherill |
| 9,140,377 B2 | 9/2015 | Becker |
| 9,146,172 B2 | 9/2015 | Trescott |
| 9,151,022 B2 | 10/2015 | Patel |
| 9,157,540 B2 | 10/2015 | Larsen |
| 9,207,143 B2 | 12/2015 | Franklin |
| 9,222,490 B2 | 12/2015 | Fishwick |
| 9,222,848 B2 | 12/2015 | Cho |
| 9,234,679 B2 | 1/2016 | Deivasigamani |
| 9,239,059 B2 | 1/2016 | Locke |
| 9,241,451 B2 | 1/2016 | Ersavas |
| 9,244,449 B2 | 1/2016 | Tennyson |
| 9,250,105 B2 | 2/2016 | Patel |
| 9,258,952 B2 | 2/2016 | Walker |
| 9,261,218 B2 | 2/2016 | Cheatham |
| 9,265,204 B2 | 2/2016 | Younis |
| 9,275,536 B2 | 3/2016 | Wetherill |
| 9,291,520 B2 | 3/2016 | Fleury |
| 9,297,150 B2 | 3/2016 | Klicpera |
| 9,297,467 B1 | 3/2016 | Goseco |
| 9,298,191 B2 | 3/2016 | Meyer |
| 9,322,682 B2 | 4/2016 | White |
| 9,393,586 B2 | 7/2016 | Donner |
| 9,410,636 B2 | 8/2016 | Older |
| 9,470,562 B2 | 10/2016 | Frisch |
| 9,476,517 B2 | 10/2016 | Gomes, II |
| 9,494,480 B2 | 11/2016 | Klicpera |
| 9,506,785 B2 | 11/2016 | Turk |
| 9,597,699 B2 | 3/2017 | Helmsderfer |
| 9,724,708 B2 | 8/2017 | Helmsderfer |
| 9,749,792 B2 | 8/2017 | Klicpera |

(56) References Cited

U.S. PATENT DOCUMENTS

| | | | |
|---|---|---|---|
| 9,832,939 B2 | 12/2017 | Russell | |
| 9,847,265 B2 | 12/2017 | Donner | |
| 9,857,805 B2 | 1/2018 | Halimi | |
| 10,039,240 B2 | 8/2018 | Darnold | |
| 10,119,537 B2 | 11/2018 | Wetherill | |
| 10,473,494 B2 | 11/2019 | Allen | |
| 10,634,538 B2 | 4/2020 | Allen | |
| 10,955,270 B2 * | 3/2021 | Al-Ali | G01D 13/06 |
| 11,338,226 B2 | 5/2022 | Dieker | |
| 2001/0049563 A1 | 12/2001 | Addink | |
| 2002/0002425 A1 | 1/2002 | Dossey | |
| 2002/0010516 A1 | 1/2002 | Addink | |
| 2002/0059836 A1 | 5/2002 | Dodsworth | |
| 2003/0047008 A1 | 3/2003 | Gopalakrishnan | |
| 2003/0109964 A1 | 6/2003 | Addink | |
| 2003/0111178 A1 | 6/2003 | Morita | |
| 2003/0179102 A1 | 9/2003 | Barnes | |
| 2003/0182022 A1 | 9/2003 | Addink | |
| 2003/0183018 A1 | 10/2003 | Addink | |
| 2003/0197617 A1 | 10/2003 | Berger | |
| 2004/0015270 A1 | 1/2004 | Addink | |
| 2004/0073524 A1 | 4/2004 | Smith | |
| 2004/0128034 A1 | 7/2004 | Lenker | |
| 2004/0206405 A1 | 10/2004 | Smith | |
| 2004/0217041 A1 | 11/2004 | Baarman | |
| 2004/0217189 A1 | 11/2004 | Regli | |
| 2005/0028609 A1 | 2/2005 | Langemann | |
| 2005/0039546 A1 | 2/2005 | Payne | |
| 2005/0067049 A1 | 3/2005 | Fima | |
| 2005/0126635 A1 | 6/2005 | Addink | |
| 2005/0166666 A1 | 8/2005 | Tsukagoshi | |
| 2005/0195078 A1 | 9/2005 | Basinger | |
| 2005/0199842 A1 | 9/2005 | Parsons | |
| 2005/0224118 A1 | 10/2005 | Tornay | |
| 2005/0229716 A1 | 10/2005 | Unsworth | |
| 2005/0235306 A1 | 10/2005 | Fima | |
| 2005/0279169 A1 | 12/2005 | Lander | |
| 2006/0005620 A1 | 1/2006 | Koike | |
| 2006/0027267 A1 | 2/2006 | Fritze | |
| 2006/0030990 A1 | 2/2006 | Anderson | |
| 2006/0102236 A1 | 5/2006 | Phillips | |
| 2006/0137419 A1 | 6/2006 | Mizohata | |
| 2006/0157580 A1 | 7/2006 | Regli | |
| 2006/0168611 A1 | 7/2006 | Fima | |
| 2006/0174707 A1 | 8/2006 | Zhang | |
| 2006/0196212 A1 | 9/2006 | Jenkins | |
| 2006/0202051 A1 | 9/2006 | Parsons | |
| 2006/0248934 A9 | 11/2006 | Mizohata | |
| 2006/0260691 A1 | 11/2006 | Davidoff | |
| 2006/0267758 A1 | 11/2006 | Barth | |
| 2006/0272704 A1 | 12/2006 | Fima | |
| 2006/0272830 A1 | 12/2006 | Fima | |
| 2007/0068225 A1 | 3/2007 | Brown | |
| 2007/0095400 A1 | 5/2007 | Bergquist | |
| 2007/0130317 A1 | 6/2007 | Lander | |
| 2007/0193334 A1 | 8/2007 | Hays | |
| 2007/0221223 A1 | 9/2007 | McDermott | |
| 2007/0284550 A1 | 12/2007 | Smith | |
| 2008/0142115 A1 | 6/2008 | Vogt | |
| 2008/0143540 A1 | 6/2008 | Savla | |
| 2008/0173084 A1 | 7/2008 | Wiesinger | |
| 2008/0184775 A1 | 8/2008 | Yamagishi | |
| 2008/0184781 A1 | 8/2008 | Mulligan | |
| 2008/0185049 A1 | 8/2008 | Mulligan | |
| 2008/0185050 A1 | 8/2008 | Mulligan | |
| 2008/0188991 A1 | 8/2008 | Mulligan | |
| 2008/0266125 A1 | 10/2008 | Windisch | |
| 2008/0276722 A1 | 11/2008 | Wiedmann | |
| 2008/0284175 A1 | 11/2008 | Nagler | |
| 2008/0285049 A1 | 11/2008 | Rembe | |
| 2008/0295895 A1 | 12/2008 | Vincent | |
| 2009/0001193 A1 | 1/2009 | Parsons | |
| 2009/0007968 A1 | 1/2009 | Knecht | |
| 2009/0035121 A1 | 2/2009 | Watson | |
| 2009/0085756 A1 | 4/2009 | Atassi | |
| 2009/0091461 A1 | 4/2009 | Kim | |
| 2009/0123340 A1 | 5/2009 | Knudsen | |
| 2009/0179165 A1 | 7/2009 | Parsons | |
| 2009/0194719 A1 | 8/2009 | Mulligan | |
| 2009/0235992 A1 | 9/2009 | Armstrong | |
| 2009/0283160 A1 | 11/2009 | Fishwick | |
| 2009/0301173 A1 | 12/2009 | Lamberti | |
| 2009/0321535 A1 | 12/2009 | Davis | |
| 2010/0023170 A1 | 1/2010 | Sherwood | |
| 2010/0023172 A1 | 1/2010 | Malinowski | |
| 2010/0038440 A1 | 2/2010 | Ersavas | |
| 2010/0045471 A1 | 2/2010 | Meyers | |
| 2010/0071458 A1 | 3/2010 | Wiedenhoefer | |
| 2010/0132803 A1 | 6/2010 | Fima | |
| 2010/0145635 A1 | 6/2010 | Pauncz | |
| 2010/0204839 A1 | 8/2010 | Behm | |
| 2010/0212748 A1 | 8/2010 | Davidoff | |
| 2010/0212752 A1 | 8/2010 | Fima | |
| 2010/0258204 A1 | 10/2010 | Cipolla | |
| 2010/0289652 A1 | 11/2010 | Javey | |
| 2010/0294021 A1 | 11/2010 | Makino | |
| 2010/0312438 A1 | 12/2010 | Cooley | |
| 2010/0326372 A1 | 12/2010 | Kim | |
| 2011/0035063 A1 | 2/2011 | Palayur | |
| 2011/0050395 A1 | 3/2011 | Ervin | |
| 2011/0054712 A1 | 3/2011 | Baraty | |
| 2011/0073189 A1 | 3/2011 | Elbert | |
| 2011/0155269 A1 | 6/2011 | Martin | |
| 2011/0166714 A1 | 7/2011 | Stachnik | |
| 2011/0174706 A1 | 7/2011 | Russell | |
| 2011/0190947 A1 | 8/2011 | Savelle | |
| 2011/0191267 A1 | 8/2011 | Savic | |
| 2011/0232770 A1 | 9/2011 | Baggett | |
| 2011/0302995 A1 | 12/2011 | Lebeau | |
| 2011/0309274 A1 | 12/2011 | Parsons | |
| 2012/0024080 A1 | 2/2012 | Carbone, II | |
| 2012/0036091 A1 | 2/2012 | Cook | |
| 2012/0056711 A1 | 3/2012 | Hanrahan | |
| 2012/0084023 A1 | 4/2012 | Mavridoglou | |
| 2012/0160034 A1 | 6/2012 | Bardon | |
| 2012/0191260 A1 | 7/2012 | Addink | |
| 2012/0191380 A1 | 7/2012 | Winter | |
| 2012/0216895 A1 | 8/2012 | Fishwick | |
| 2012/0223153 A1 | 9/2012 | Helmsderfer | |
| 2012/0298220 A1 | 11/2012 | Hidaka | |
| 2012/0324985 A1 | 12/2012 | Gu | |
| 2013/0037624 A1 | 2/2013 | Helmsderfer | |
| 2013/0085690 A1 | 4/2013 | Fei | |
| 2013/0112003 A1 * | 5/2013 | Yamauchi | G01L 19/16 73/741 |
| 2013/0174649 A1 | 7/2013 | Hains | |
| 2013/0248023 A1 | 9/2013 | Estrada | |
| 2013/0255786 A1 | 10/2013 | Nakai | |
| 2013/0291974 A1 | 11/2013 | Bourgeois | |
| 2013/0310992 A1 | 11/2013 | Larsen | |
| 2013/0325194 A1 | 12/2013 | Brine | |
| 2013/0325371 A1 | 12/2013 | Brine | |
| 2013/0332397 A1 | 12/2013 | Scolnicov | |
| 2013/0335218 A1 | 12/2013 | Jones | |
| 2013/0341420 A1 | 12/2013 | Lister | |
| 2014/0069506 A1 | 3/2014 | Helmsderfer | |
| 2014/0077108 A1 | 3/2014 | Ringer | |
| 2014/0109644 A1 | 4/2014 | Carbone, II | |
| 2014/0121999 A1 | 5/2014 | Bracken | |
| 2014/0129039 A1 | 5/2014 | Olive-Chahinian | |
| 2014/0196802 A1 | 7/2014 | Guy | |
| 2014/0222223 A1 | 8/2014 | Horton | |
| 2014/0230925 A1 | 8/2014 | Halimi | |
| 2014/0236868 A1 | 8/2014 | Cook | |
| 2014/0245208 A1 | 8/2014 | Javey | |
| 2014/0251478 A1 | 9/2014 | Dolezilek | |
| 2014/0257720 A1 | 9/2014 | Smirnov | |
| 2014/0261714 A1 | 9/2014 | Burt | |
| 2014/0288858 A1 | 9/2014 | Franklin | |
| 2014/0306828 A1 | 10/2014 | Trescott | |
| 2014/0316723 A1 | 10/2014 | Rogers | |
| 2014/0331745 A1 | 11/2014 | Schaefer | |
| 2014/0332088 A1 | 11/2014 | Senesh | |
| 2014/0343736 A1 | 11/2014 | Meyer | |

(56) References Cited

U.S. PATENT DOCUMENTS

| | | |
|---|---|---|
| 2014/0345516 A1 | 11/2014 | DeVerse |
| 2014/0348205 A1 | 11/2014 | Shaw |
| 2014/0366612 A1 | 12/2014 | Horne |
| 2015/0002300 A1 | 1/2015 | Cho |
| 2015/0007897 A1 | 1/2015 | Valentine |
| 2015/0045970 A1 | 2/2015 | Anderson |
| 2015/0051743 A1 | 2/2015 | Darnold |
| 2015/0069084 A1 | 3/2015 | Phallen |
| 2015/0097059 A1 | 4/2015 | Helmsderfer |
| 2015/0102136 A1 | 4/2015 | Malsam |
| 2015/0114490 A1 | 4/2015 | Carpenter |
| 2015/0122364 A1 | 5/2015 | Cheatham |
| 2015/0152861 A1 | 6/2015 | Stoner |
| 2015/0204701 A1 | 7/2015 | Klicpera |
| 2015/0206255 A1 | 7/2015 | Groeneveld |
| 2015/0211510 A1 | 7/2015 | Walsh |
| 2015/0211650 A1 | 7/2015 | Older |
| 2015/0247586 A1 | 9/2015 | Gomes, II |
| 2015/0253163 A1 | 9/2015 | Ruiz Cortez |
| 2015/0260310 A1 | 9/2015 | Bahalul |
| 2015/0286222 A1 | 10/2015 | Goldstein |
| 2015/0308084 A1 | 10/2015 | Thompson |
| 2015/0308089 A1 | 10/2015 | Thompson |
| 2015/0316936 A1 | 11/2015 | McCarrick |
| 2015/0323097 A1 | 11/2015 | Stoltz |
| 2015/0323412 A1 | 11/2015 | Stoltz |
| 2015/0348395 A1 | 12/2015 | Trout |
| 2015/0355045 A1 | 12/2015 | Solomon |
| 2015/0367357 A1 | 12/2015 | Humpal |
| 2015/0367358 A1 | 12/2015 | Funseth |
| 2015/0375247 A1 | 12/2015 | Funseth |
| 2015/0376874 A1 | 12/2015 | Breedlove |
| 2015/0376875 A1 | 12/2015 | Patel |
| 2016/0011072 A1 | 1/2016 | Hale |
| 2016/0018283 A1 | 1/2016 | Fleury |
| 2016/0037736 A1 | 2/2016 | Rainone |
| 2016/0041565 A1 | 2/2016 | Edwards |
| 2016/0048135 A1 | 2/2016 | Hill |
| 2016/0050859 A1 | 2/2016 | Larsen |
| 2016/0055649 A1 | 2/2016 | Peret |
| 2016/0069772 A1 | 3/2016 | Gnoss |
| 2016/0073063 A1 | 3/2016 | Peret |
| 2016/0076909 A1 | 3/2016 | Klicpera |
| 2016/0076965 A1 | 3/2016 | Edris |
| 2016/0083937 A1 | 3/2016 | Cavarec |
| 2016/0090717 A1 | 3/2016 | Trescott |
| 2016/0113220 A1 | 4/2016 | Walker |
| 2016/0163177 A1 | 6/2016 | Klicpera |
| 2016/0197467 A1 | 7/2016 | Stepp |
| 2016/0219805 A1 | 8/2016 | Romney |
| 2016/0288156 A1 | 10/2016 | Donner |
| 2016/0345515 A1 | 12/2016 | Helmsderfer |
| 2016/0377464 A1 | 12/2016 | Adlon |
| 2017/0061727 A1 | 3/2017 | Savaëte |
| 2017/0204820 A1 | 7/2017 | Dirnberger |
| 2017/0259226 A1 | 9/2017 | Bayer |
| 2017/0318761 A1 | 11/2017 | Rainone |
| 2017/0333919 A1 | 11/2017 | Helmsderfer |
| 2017/0345728 A1 | 11/2017 | Donner |
| 2017/0370754 A1 | 12/2017 | Croteau |
| 2018/0017423 A1 | 1/2018 | Allen |
| 2018/0087937 A1* | 3/2018 | Al-Ali .................... G01D 13/06 |
| 2018/0106655 A1 | 4/2018 | Kilcran |
| 2018/0136673 A1 | 5/2018 | Halimi |
| 2018/0172537 A1 | 6/2018 | Cimberio |
| 2018/0220600 A1 | 8/2018 | Russell |
| 2018/0259982 A1 | 9/2018 | Halimi |
| 2018/0338435 A1 | 11/2018 | Darnold |
| 2019/0120671 A1 | 4/2019 | Allen |
| 2022/0042833 A1* | 2/2022 | Al-Ali ...................... G01D 7/02 |
| 2022/0236089 A1 | 7/2022 | Allen |

FOREIGN PATENT DOCUMENTS

| | | | |
|---|---|---|---|
| JP | 10206263 A | * | 8/1998 |
| JP | 2009063559 A | * | 3/2009 |
| JP | 2016017756 | | 2/2016 |

OTHER PUBLICATIONS

1998 Polaris RMK 700 Fuel Cap / Gas Gauge, <https://www.ebay.com/itm/1998-POLARIS-RMK-700-Fuel-Cap-Gas-Gauge/283761973379?>, 10 pages, publicly available before Jul. 13, 2015.

Catron, M. Bezel Overview, Rain Bird®, Nov. 16, 2017, 5 pages.

Catron, Mark. Dial Artwork—International: Ted Concept #1a and #1b, Rain Bird® , Jun. 18, 2018, 2 pages.

Catron, Mark. Bezel Artwork Concepts, Rain Bird®, dated Dec. 10, 2017, 8 pages.

Catron, Mark. Bezel Artwork Concepts, Rain Bird®, dated Dec. 4, 2017, 6 pages.

Catron, Mark. Bezel Artwork Overview. Rain Bird®, dated May 25, 2018, 5 pages.

Catron, Mark. Concept 1 and Concept 2, Rain Bird®, Mar. 17, 2018, 2 pages.

Catron, Mark. Dial Artwork—Domestic: Ted Concept #1a, #1b, #2a, and #2b, Rain Bird®, Jun. 10, 2018, 4 pages.

Catron, Mark. Dial Artwork—Domestic: Ted Concept #1a, #1b, and #2, Rain Bird®, Jun. 8, 2018, 3 pages.

Catron, Mark. Dial Artwork—International and Domestic, Rain Bird®, dated Jun. 5, 2018, 2 pages.

FLOWVIS® Flow Meter, H2Flow Controls: Progress Through Innovation™, <www.h2flow.net>, 2018, 5 pages.

International Search Report and Written Opinion, International Application No. PCT/US2017/042004, dated Sep. 14, 2017, 6 pages.

Owfeel of 3 Dragonfly Toy Plastic Twisty Flying Saucers Spinning Shooter Flying Disc Toys, <https://www.amazon.com/Owfeel-Dragonfly-Spinning-Children-Randomly/dp/B00IDUPUY0>, at least prior to Jul. 13, 2017, 1 page.

Rain Bird® Catalog, Landscape Irrigation Products, 2008-2009, p. 40.

Rain Bird® Initial Concepts, Nov. 8, 2017, 1 page.

Rain Bird® Owner's Manual for Flow Sensors by Data Industrial, Mar. 23, 2015, 11 pages.

Rain Bird® PT3002 Flow Sensor Transmitter, Installation and Programming Instructions, 2012, 48 pages.

Rain Bird® Scale: 2-1 (200%), GPM Flow Full Indexes, at least prior to Jul. 13, 2017, p. 1.

Rain Bird® Scale: 2-1 (200%), GPM Flow, at least prior to Jul. 13, 2017, p. 1.

Rain Bird® Tech Spec, Flow Sensors—BSP: Flow Sensing for Maxicom2®, SiteControl™, IQ™ v2.0, LXD, LXME, LXMEF, <www.rainbird.com>, 2015, 5 pages.

Rain Bird® Tech Spec, Flow Sensors—NPT: Flow Sensing for Maxicom2®, SiteControl™, IQv2.0, ESP-LXD, ESP-LXMEF, <www.rainbird.com>, 2015, 5 pages.

Rain Bird® Troubleshooting Guide, FS Series Flow Sensors, 2016, 2 pages.

Rotameter, <https://en.wikipedia.org/wiki/Rotameter>, Wikipedia, at least prior to Jul. 13, 2017, 3 pages.

USPTO, U.S. Appl. No. 15/792,273; Office Action dated Mar. 15, 2019; (pp. 1-14).

USPTO; U.S. Appl. No. 14/213,328; Notice of Allowance dated Oct. 17, 2016.

USPTO; U.S. Appl. No. 15/649,332, Application filed Jul. 13, 2017, entitled "Flow Sensor,".

USPTO; U.S. Appl. No. 15/649,332; Notice of Allowance dated Mar. 10, 2020; (pp. 1-5).

USPTO; U.S. Appl. No. 15/649,332; Office Action dated Apr. 1, 2019; (pp. 1-9).

USPTO; U.S. Appl. No. 15/649,332; Office Action dated Aug. 20, 2019; (pp. 1-8).

USPTO; U.S. Appl. No. 15/792,273, Application filed Oct. 24, 2017, entitled "Flow Sensor,".

(56) References Cited

OTHER PUBLICATIONS

USPTO; U.S. Appl. No. 16/858,159, Application filed Apr. 24, 2020, entitled "Flow Sensor,".
USPTO; U.S. Appl. No. 62/361,873, Application filed Jul. 13, 2016, entitled "Flow Sensor,".
USPTO; U.S. Appl. No. 62/786,822, Application filed Dec. 31, 2018, entitled "Flow Sensor Gauge,".
USTPO; U.S. Appl. No. 62/427,675, Application filed Nov. 29, 2016, entitled "Flow Sensor,".

* cited by examiner

| Angle Deg. | Displacement in | 30 GPM Target Flow Rate Gallons | Liters | in^3/sec | Calculated Force |
|---|---|---|---|---|---|
| 0 | 0 | 0 | 0 | 0 | 0 |
| 18.75 | 0.1 | 1.88 | 7.13 | 7.21875 | 0.110265755 |
| 37.5 | 0.2 | 3.75 | 14.25 | 14.4375 | 0.22053151 |
| 56.25 | 0.3 | 5.63 | 21.38 | 21.65625 | 0.330797265 |
| 75 | 0.4 | 7.50 | 28.50 | 28.875 | 0.44106302 |
| 93.75 | 0.5 | 9.38 | 35.63 | 36.09375 | 0.551328775 |
| 112.5 | 0.6 | 11.25 | 42.73 | 43.3125 | 0.66159453 |
| 131.25 | 0.7 | 13.13 | 49.88 | 50.53125 | 0.771860285 |
| 150 | 0.8 | 15.00 | 57.00 | 57.75 | 0.88212604 |
| 168.75 | 0.9 | 16.88 | 64.13 | 64.96875 | 0.992391795 |
| 187.5 | 1 | 18.75 | 71.25 | 72.1875 | 1.10265755 |
| 206.25 | 1.1 | 20.63 | 78.38 | 79.40625 | 1.212923305 |
| 225 | 1.2 | 22.50 | 85.50 | 86.625 | 1.32318906 |
| 243.75 | 1.3 | 24.38 | 92.63 | 93.84375 | 1.433454815 |
| 262.5 | 1.4 | 26.25 | 99.75 | 101.0625 | 1.543720257 |
| 281.25 | 1.5 | 28.13 | 106.88 | 108.2813 | 1.653986325 |
| 300 | 1.6 | 30.00 | 114.00 | 115.5 | 1.76425208 |

This is the load from the flow plus the friction: 1.10265755

An angle range of 300 deg and a displacement of 1.6" was selected. At 30 GPM and 1.6" the force calculated from Flow Simulation is 1.7642521 lbf.

The force of 1.7642521 lbf is divided by the 1.6" displacement to get the spring constant for this application. That spring constant is then used to determine the load for a given displacement. Those values are in the Calculated Force column.

FIG. 24

| Piston Position | Load @ position | | | | | | | | |
|---|---|---|---|---|---|---|---|---|---|
| | Liters | 0.987 | 2.543 | 3.762 | 4.611 | 5.156 | 5.489 | 5.686 | 5.922 |
| | GPM | 0.260 | 0.669 | 0.990 | 1.213 | 1.357 | 1.444 | 1.496 | 1.558 |
| | Flow Rate, in^/sec | 1.000 | 2.576 | 3.811 | 4.671 | 5.224 | 5.561 | 5.760 | 6.000 |
| | | 0.00333 | 0.02082 | 0.4484 | 0.06686 | 0.08324 | 0.09410 | 0.1008 | 0.10170 |
| 0.10 | 0.110266 | | | | | | | | |
| 0.20 | 0.220532 | | | | | | | | |
| 0.30 | 0.330797 | | | | | | | | |
| 0.40 | 0.441063 | | | | | | | | |
| 0.50 | 0.551329 | | | | | | | | |
| 0.60 | 0.661595 | | | | | | | | |
| 0.70 | 0.771860 | | | | | | | | |
| 0.80 | 0.882126 | | | | | | | | |
| 0.90 | 0.992392 | | | | | | | | |
| 1.00 | 1.102658 | | | | | | | | |
| 1.10 | 1.212923 | | | | | | | | |
| 1.20 | 1.323189 | | | | | | | | |
| 1.30 | 1.433455 | | | | | | | | |
| 1.40 | 1.543721 | | | | | | | | |
| 1.50 | 1.653986 | | | | | | | | |
| 1.60 | 1.764252 | | | | | | | | |

FIG. 25A

| 7.306 | 8.048 | 8.602 | 8.883 | 10.533 | 11.096 | 11.278 | 11.844 | 13.425 | 13.797 | 13.818 |
| --- | --- | --- | --- | --- | --- | --- | --- | --- | --- | --- |
| 1.923 | 2.118 | 2.264 | 2.338 | 2.772 | 2.920 | 2.968 | 3.117 | 3.533 | 3.631 | 3.636 |
| 7.402 | 8.154 | 8.716 | 9.000 | 10.671 | 11.242 | 11.427 | 12.000 | 13.602 | 13.979 | 14.000 |
| 0.15397 | 0.20375 | 0.21246 | | | | | | | | |
| | | | 0.20363744 | 0.2850801 | 0.31577 | 0.32614 | | | | |
| | | | | | | | 0.32141 | 0.41156 | 0.43448 | 0.44827 |

| | | | | | | | | | | | | |
|---|---|---|---|---|---|---|---|---|---|---|---|---|
| 24.759 | 25.662 | 28.209 | 28.442 | 29.610 | 34.545 | 36.411 | 37.108 | 39.481 | 44.416 | 48.164 | | |
| 6.516 | 6.753 | 7.423 | 7.485 | 7.792 | 9.091 | 9.582 | 9.765 | 10.390 | 11.688 | 12.675 | | |
| 25.085 | 26.000 | 28.580 | 28.817 | 30.000 | 35.000 | 36.890 | 37.596 | 40.000 | 45.000 | 48.798 | | |
| | | | | | | | | | | | | |
| | 0.80698 | 0.97474 | 0.99070 | | 1.25711 | 1.45376 | | | | | | |
| 0.88042 | | | | | 1.43611 | | | | | | | |
| | | | | 0.70452 | | | 1.05796 | 1.09897 | 1.57126 | 1.18617 | | |
| | | | | | | | | 0.79922 | | | | |

| 88.831 | 93.766 | 103.203 | 103.636 | 104.245 | 113.527 | 113.882 | 118.442 | 123.377 |
|---|---|---|---|---|---|---|---|---|
| 23.377 | 24.675 | 27.159 | 27.273 | 27.433 | 29.876 | 29.969 | 31.169 | 32.468 |
| 90.000 | 95.000 | 104.561 | 105.000 | 105.617 | 115.021 | 115.381 | 120.000 | 125.000 |

| Deg. of Movement | Flow Rate Equal Dist. |
|---|---|
| 0 | 0 |
| 18.75 | 1.875 |
| 37.5 | 3.75 |
| 56.25 | 5.625 |
| 75 | 7.5 |
| 93.75 | 9.375 |
| 112.5 | 11.25 |
| 131.25 | 13.125 |
| 150 | 15 |
| 168.75 | 16.875 |
| 187.5 | 18.75 |
| 206.25 | 20.625 |
| 225 | 22.5 |
| 243.75 | 24.375 |
| 262.5 | 26.25 |
| 281.25 | 28.125 |
| 300 | 30 |

FIG. 25G

These values are charted and a trendline is established with a "0,0" intercept. An equation for the trendline is determined.
3rd Order Equation = $(10.823 * X^3) - (12.307 * X^2) + (11.532 * X)$
4th Order Equation = $(-9.0624 * X^4) + (38.732 * X^3) - (38.494 * X^2) + (18.697 * X)$

| Piston Position, X | Calculated GPM @ Piston position X, Fluid Analysis | GPM @ Piston Position Using 3rd Order Equation | GPM @ Piston Position Using 4th Order Equation |
|---|---|---|---|
| 0.10 | 1.496209 | 1.04095 | 1.52259 |
| 0.20 | 2.263802 | 1.90070 | 2.49500 |
| 0.30 | 2.967924 | 2.64419 | 3.11700 |
| 0.40 | 3.630889 | 3.33635 | 3.56661 |
| 0.50 | 4.013538 | 4.04213 | 4.00010 |
| 0.60 | 4.740126 | 4.82645 | 4.55198 |
| 0.70 | 5.682119 | 5.75426 | 5.33503 |
| 0.80 | 6.515584 | 6.89050 | 6.44026 |
| 0.90 | 7.484844 | 8.30010 | 7.93695 |
| 1.00 | 9.765 | 10.04800 | 9.87260 |
| 1.10 | 12.810 | 12.19914 | 12.27299 |
| 1.20 | 14.678 | 14.81846 | 15.14214 |
| 1.30 | 17.864 | 17.97090 | 18.46232 |
| 1.40 | 22.339 | 21.72139 | 22.19405 |
| 1.50 | 27.433 | 26.13488 | 26.27610 |
| 1.60 | 29.969 | 31.27629 | 30.62549 |

FIG. 26

| Using 3rd Order Equation = $(10.823 * X^3) - (12.307 * X^2) + (11.532 * X)$ | | |
|---|---|---|
| Expected GPM @ Piston Position, Balanced Dial Gage | Estimated Displacement for Expected GPM | Calculated GPM Based on Estimated Displacement | Delta Between Expected and Calculated |
| 1.875 | 0.1968 | 1.8753338646 | 0.00038646 |
| 3.75 | 0.4595 | 3.750486984 | 0.000486984 |
| 5.625 | 0.6872 | 5.62523 | 0.00023 |
| 7.5 | 0.8459 | 7.499640976 | -0.000359024 |
| 9.375 | 0.964 | 9.375692994 | 0.000692994 |
| 11.25 | 1.0583 | 11.248935515 | -0.001064845 |
| 13.125 | 1.1375 | 13.123035888 | -0.001964115 |
| 15 | 1.2063 | 15.0006532 | 0.000653203 |
| 16.875 | 1.2672 | 16.874159336 | -0.000840644 |
| 18.75 | 1.3222 | 18.749578964 | -0.000421036 |
| 20.625 | 1.3724 | 20.622775423 | -0.002224774 |
| 22.5 | 1.4188 | 22.498559142 | -0.001440858 |
| 24.375 | 1.462 | 24.375520166 | 0.000520166 |
| 26.25 | 1.5024 | 26.249483793 | -0.000516207 |
| 28.125 | 1.5405 | 28.125776457 | 0.000776457 |
| 30 | 1.5765 | 29.999189968 | -0.000810032 |

FIG. 26 (Continued)

Using 4th Order Equation = $(-9.0624*X^4)+(38.732*X^3)-(38.494*X^2)+(18.697*X)$

| Expected GPM @ Piston Position, Balanced Dial Gage | Estimated Displacement for Expected GPM | Calculated GPM Based on Estimated Displacement | Delta Between Expected and Calculated |
|---|---|---|---|
| 1.875 | 0.1312 | 1.8752219506 | 0.00021950506 |
| 3.75 | 0.4438 | 3.7500026256 | 2.62564E-05 |
| 5.625 | 0.7295 | 5.6240048539 | -0.000951461 |
| 7.5 | 0.8735 | 7.499140276 | -0.000859724 |
| 9.375 | 0.9764 | 9.37448966 | -0.00051034 |
| 11.25 | 1.0597 | 11.248982122 | -0.001017876 |
| 13.125 | 1.1314 | 13.123823228 | -0.001176716 |
| 15 | 1.1954 | 15.000049 | 4.90025E-05 |
| 16.875 | 1.2538 | 16.874356156 | -0.000643851 |
| 18.75 | 1.3081 | 18.749956999 | -4.30102E-05 |
| 20.625 | 1.3592 | 20.62252383 | 0.000238301 |
| 22.5 | 1.4078 | 22.500792226 | 0.000792257 |
| 24.375 | 1.4544 | 24.376027056 | 0.001027046 |
| 26.25 | 1.4994 | 26.250716669 | 0.000716688 |
| 28.125 | 1.5431 | 28.123531483 | -0.001468517 |
| 30 | 1.5859 | 29.999731129 | -0.000268881 |

FIG. 26
(Continued)

FLOW SENSOR GAUGE

CROSS-REFERENCE TO RELATED APPLICATIONS

This application claims the benefit of U.S. Provisional Application No. 62/786,822, filed Dec. 31, 2018, which is incorporated herein by reference in its entirety.

FIELD

The present invention relates to monitoring fluid flow and, more particularly, to gauges for flow sensors.

BACKGROUND

Flow through fluid systems, such as irrigation systems, can indicate unwanted conditions. For instance, fluid systems often include fluid control valves upstream of irrigation devices. The fluid control valves are subject to leaking from time-to-time. Leaking can be caused by debris being trapped between the valve member and the valve seat or the results of normal wear and tear on the valve. Irrigation devices downstream of fluid control valve also can become defective from normal wear and tear or can be damaged from normal lawn care or by vandalism. As a result, excessive water can be distributed from the system which is costly and could cause damage to vegetation.

Also, piping or conduit in fluid systems can be damaged. For example, one could unintentionally spike buried irrigation conduits with a shovel or other tool or machine during lawn care or other improvements. Further, fluid systems can develop blockage in the lines and the components which will cause an undesired amount of fluid to be delivered through system. With an irrigation system, this could result in insufficient or too much water being delivered to the vegetation. Overall, the damage or interference with proper flow in a fluid system can result in damage and additional cost.

It is desired to have a flow sensor and method that easily and cost effectively monitor flow in a fluid system to provide feedback on conditions of the system. It is further desired to have an indicator on a gauge of a flow sensor that provides a quick reference as to the flow condition and status and that is easily repositioned depending of the parameters of the system being monitored.

BRIEF DESCRIPTION OF THE DRAWINGS

FIG. 24 is a table of data used to model the twisted shaft of FIG. 21;

Figure 25C:
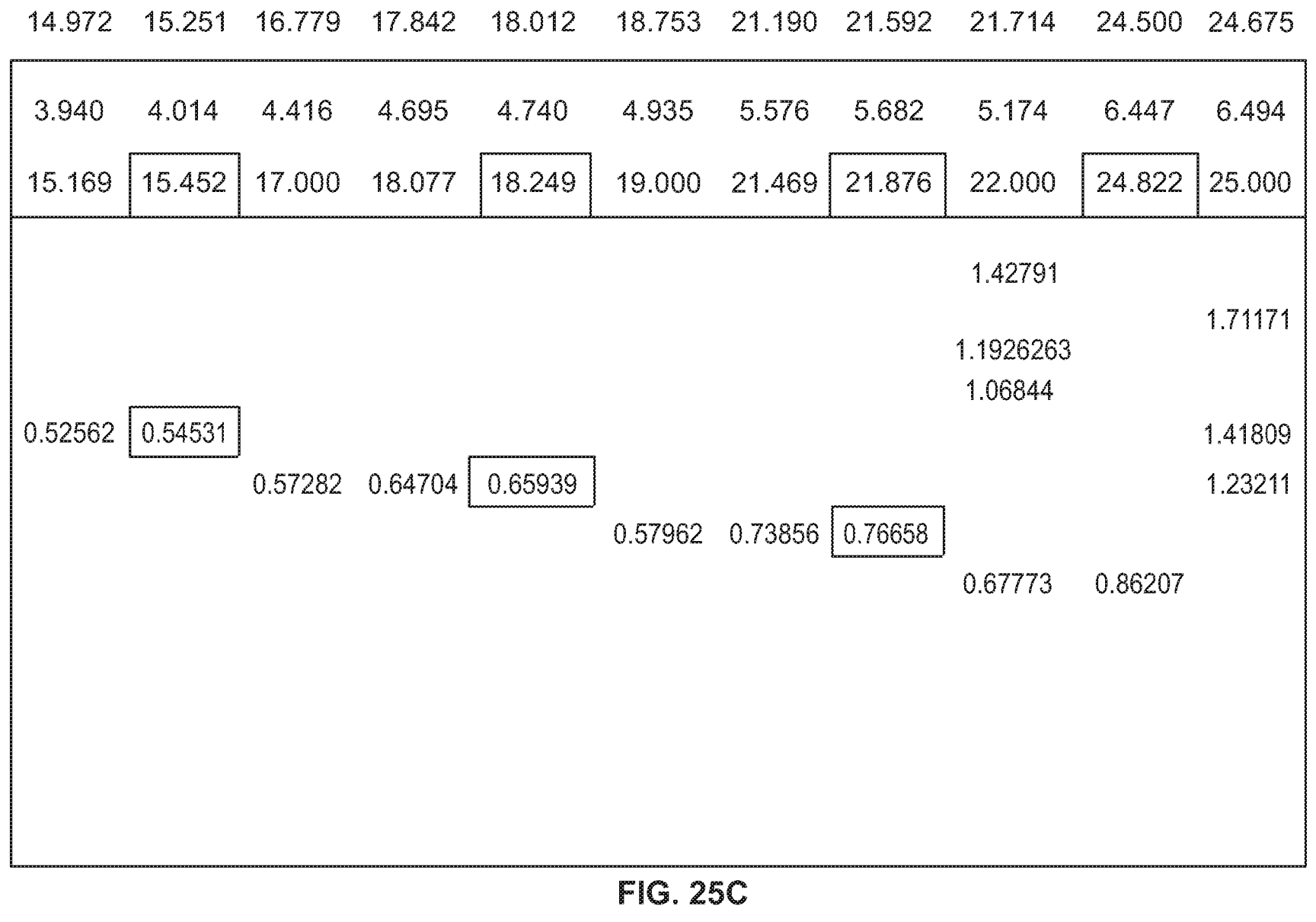
Figure 25E:
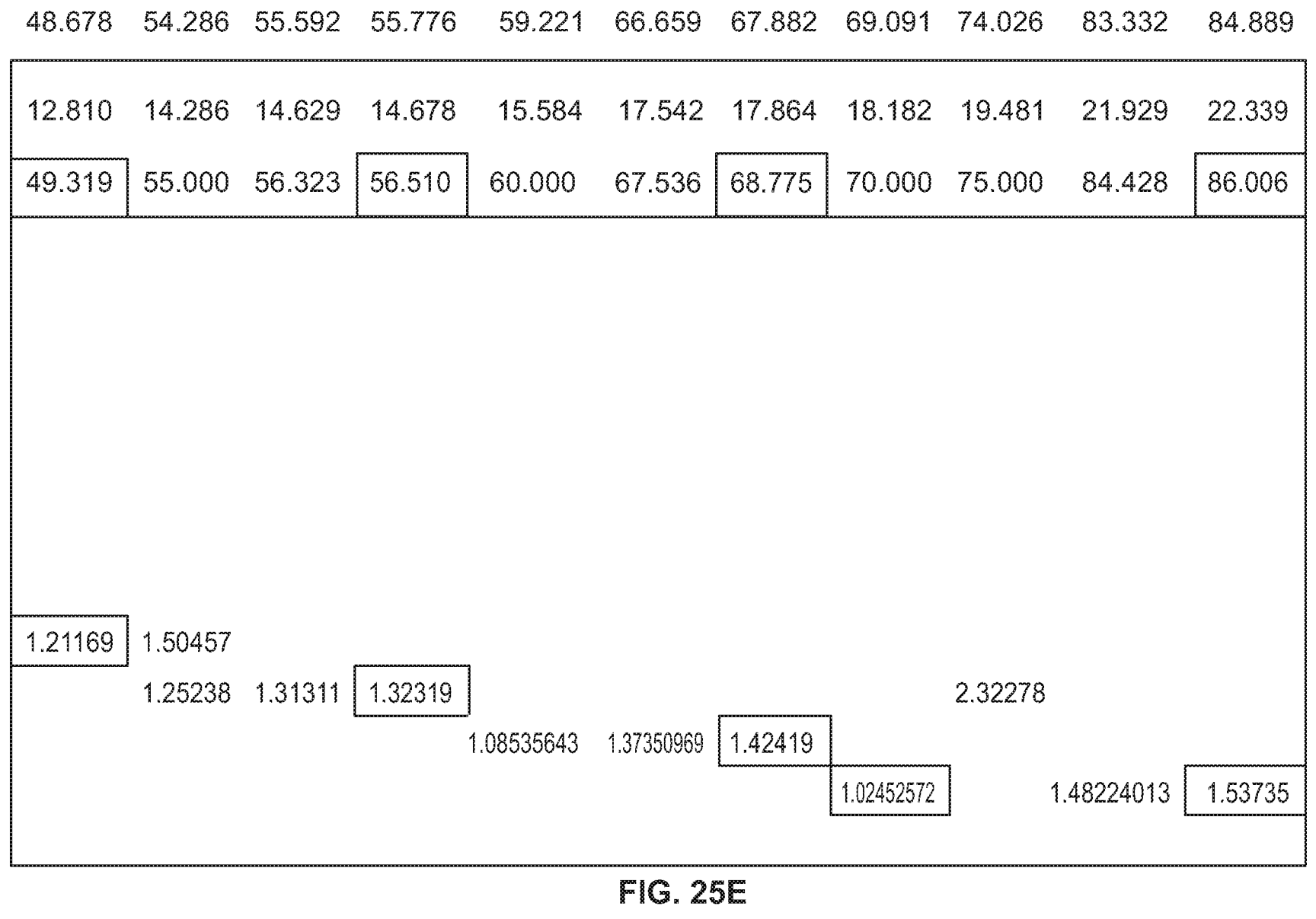

FIG. 25A is a table of data used to model the twisted shaft of FIG. 21;

FIG. 25B is a continuation of the table of data of FIG. 25A;

FIG. 25C is a continuation of the table of data of FIGS. 25A and 25B;

FIG. 25D is a continuation of the table of data of FIGS. 25A-25C;

FIG. 25E is a continuation of the table of data of FIGS. 25A-25D;

FIG. 25F is a continuation of the table of data of FIGS. 25A-25E;

FIG. 25G is a continuation of the table of data of FIGS. 25A-25F;

FIG. 26 is a table of data used to model the twisted shaft of FIG. 21.

DETAILED DESCRIPTION

Figure 1:
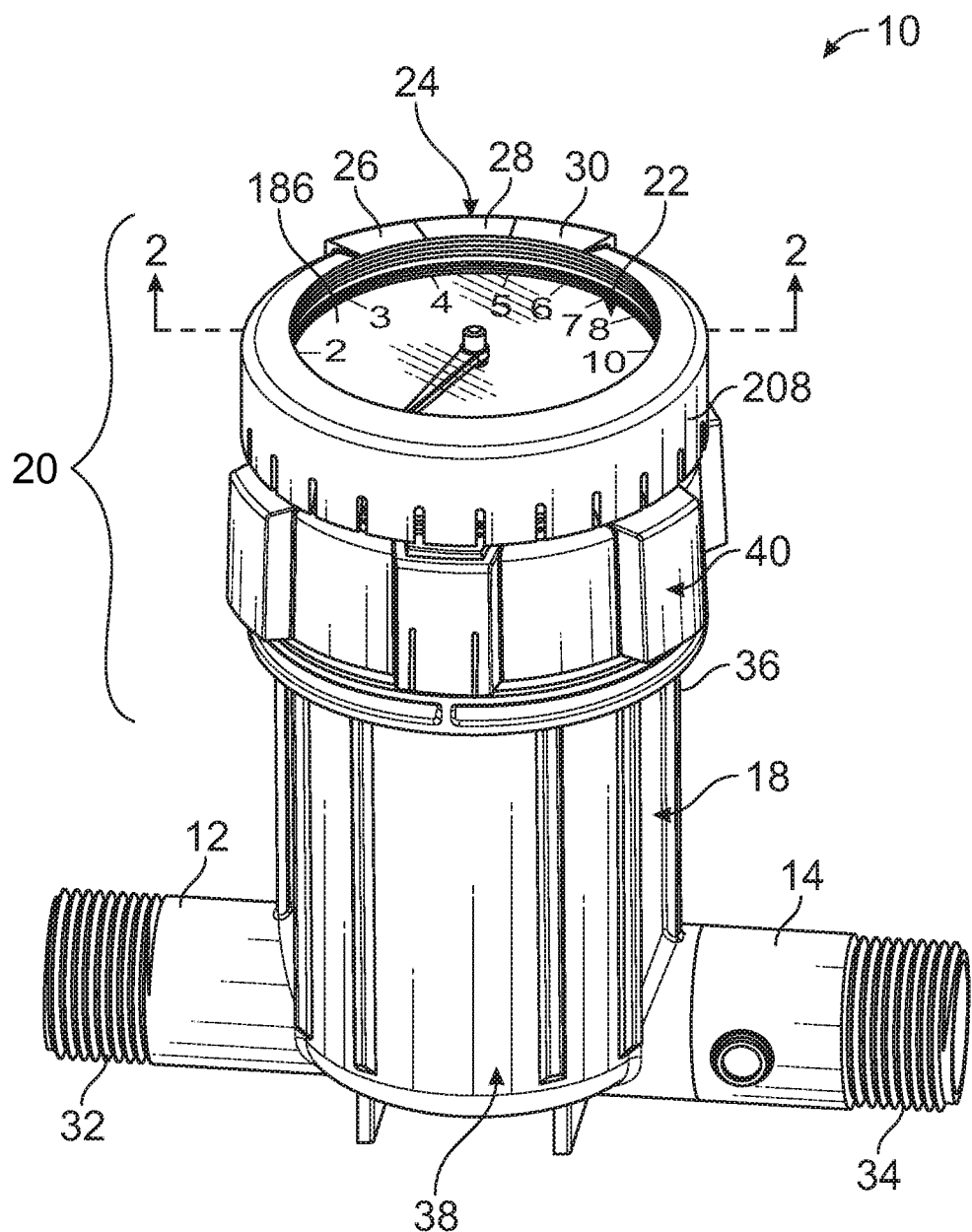
FIG. 1 is a side perspective view of a flow sensor.
Figure 2:
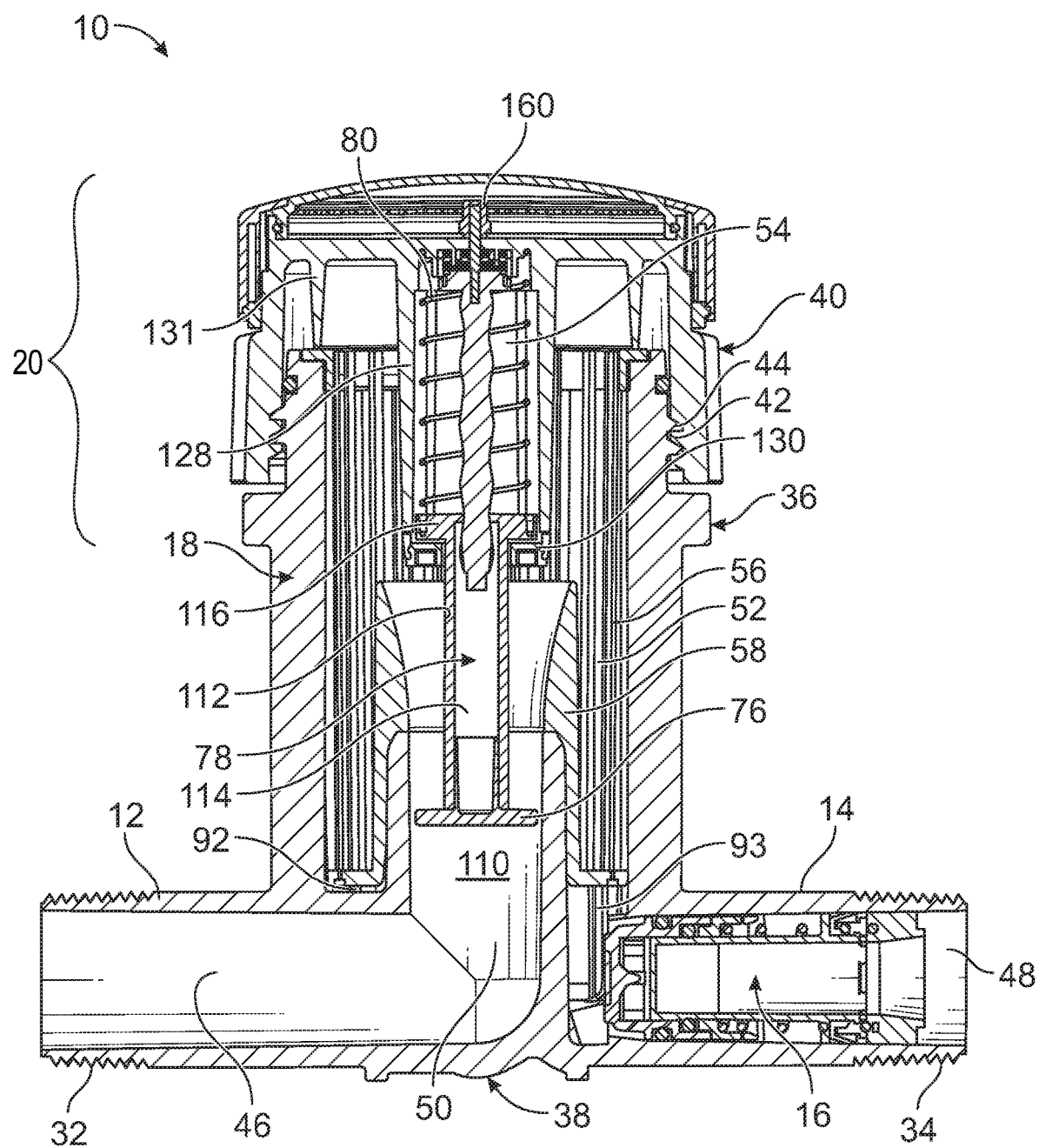
FIG. 2 is a cross-sectional view of the flow sensor of FIG. 1 taken along line 2-2 of FIG. 1.

With reference to FIGS. 1 and 2, there is shown a flow sensor 10. The flow sensor 10 can be embedded into a fluid system, such as an irrigation system. The flow sensor 10 includes an inlet 12, an outlet 14, a pressure regulator 16, a body 18 and a flow meter 20. The flow meter 20 includes a gauge 22 with an adjustable indicator 24. The indicator 24 can be easily adjusted about the gauge 22 to provide a quick reference as to the operating condition or status of the irrigation system. For instance, the indicator 24 can have a first red area 26 indicating a low flow condition, a center green area 28 indicating a normal flow condition, and a second red area 30 indicating a high flow.

The inlet 12 and the outlet 14 are configured for attachment of the flow sensor 10 to conduits in a fluid system. The inlet 12 may have exterior threading 32 for being threaded into an interior threaded conduit end or fitting. The outlet 14 may have exterior threading 34 for cooperating with interior threading on a downstream conduit end or fitting. Instead of threading, the exterior of the inlet 12 and outlet 14 may be smooth or configured with other structure for attachment to conduit or piping. Other attachment methods may include gluing, clamping or welding.

The flow meter 10 includes an upper portion 36 and a base portion 38. The upper portion 36 and the base portion 38 form the body 18. The body 18 may be a single continuous piece, with the inlet 12 and the outlet 14 at opposite sides of the base portion 38. A single piece construction for the body 18 eliminates parts and is both easier to repair and to manufacture and assemble into the flow sensor 10. A top cover 40 has internal threading 42 for threading onto external threading 44 of the upper portion 36.

The base portion 38 defines an inlet passage 46 and an outlet passage 48. The inlet passage 46 includes an upward directed tubular portion 50 at the center of the base 38. The outlet passage 48 may extend around the tubular portion 50 and over a portion of the inlet passage 46 upstream of the tubular portion 50.

Figure 3:
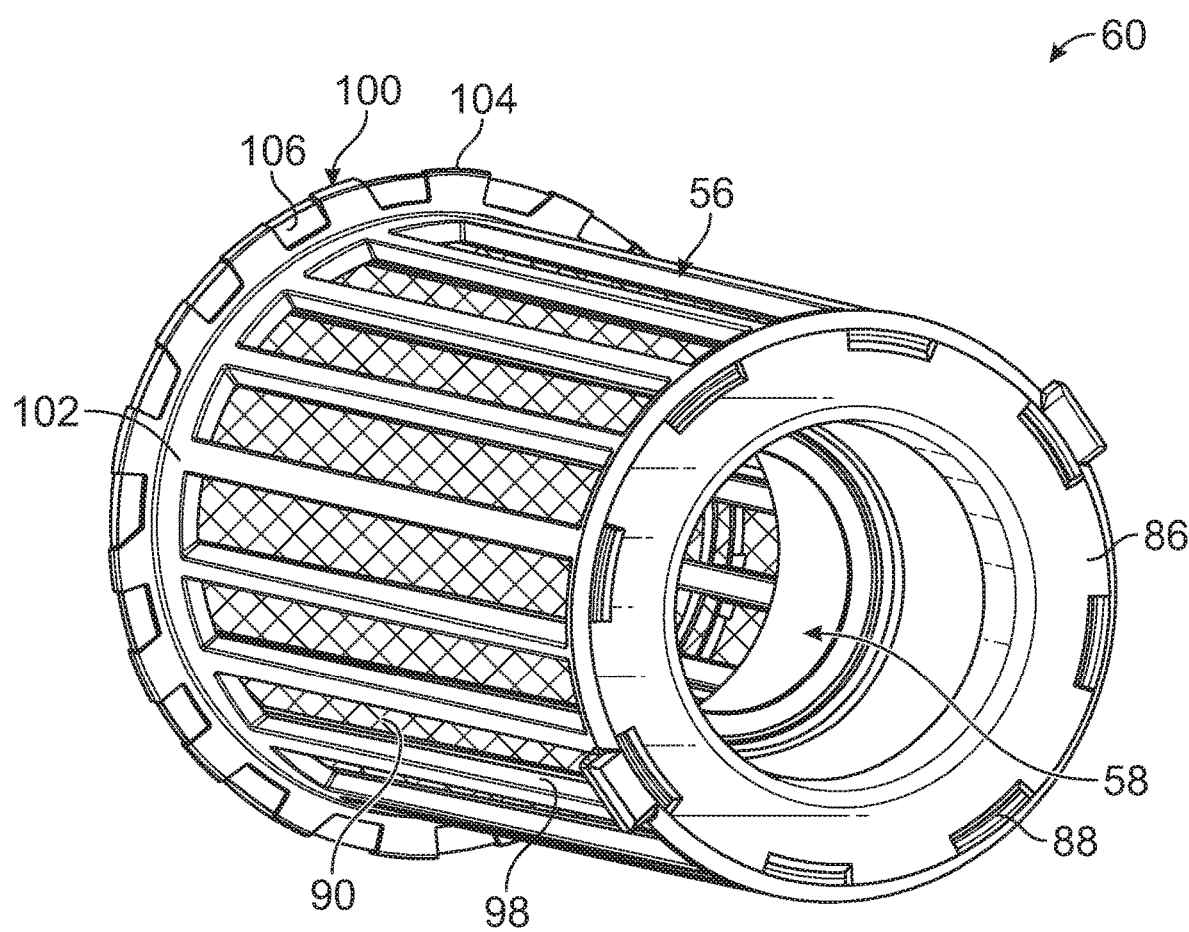
FIG. 3 is a side perspective view of a combined filter and flow guide of the flow sensor or FIG. 1.
Figure 4:
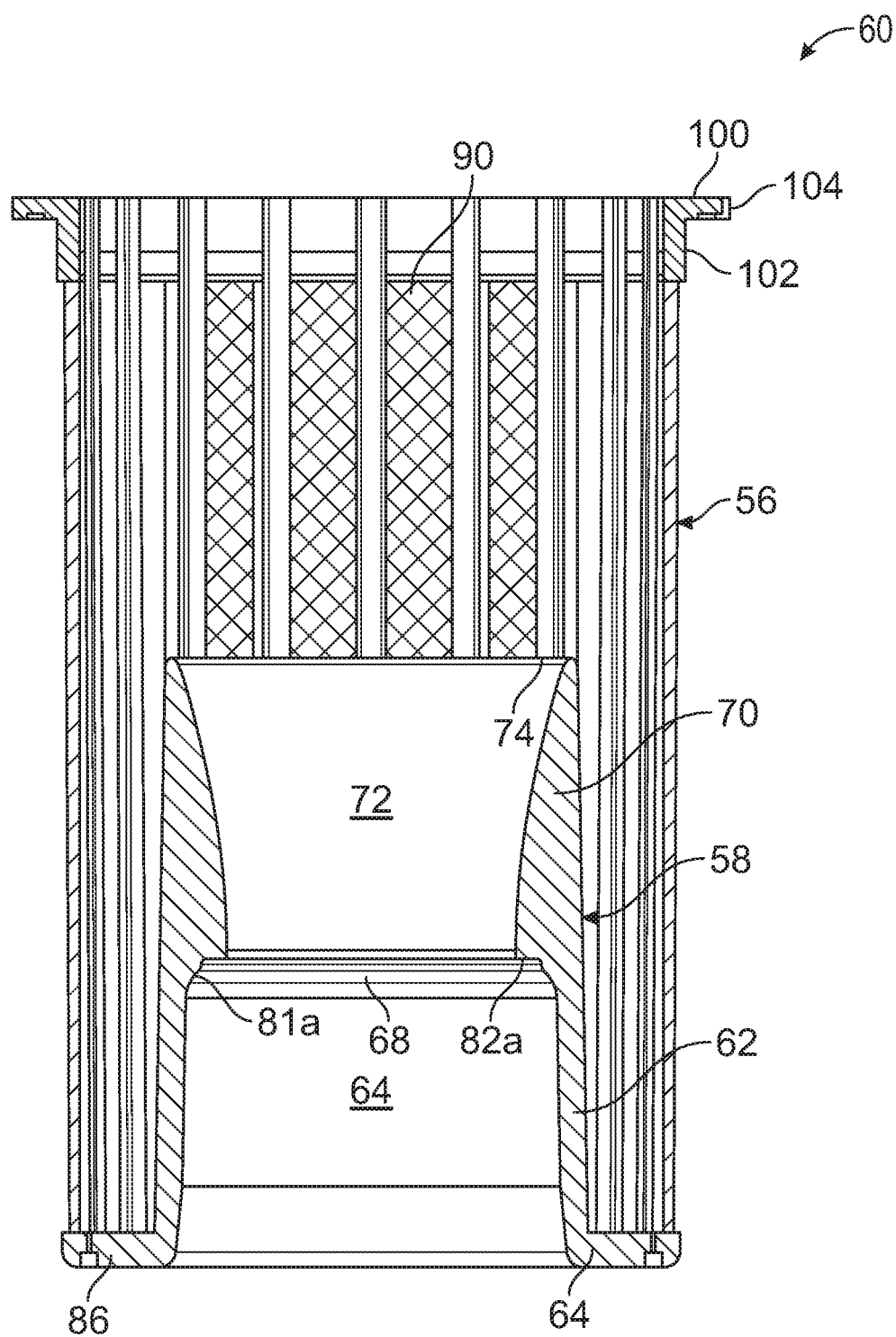
FIG. 4 is a center cross-section view of the combined filter and flow guide of FIG. 7.
Figure 5:
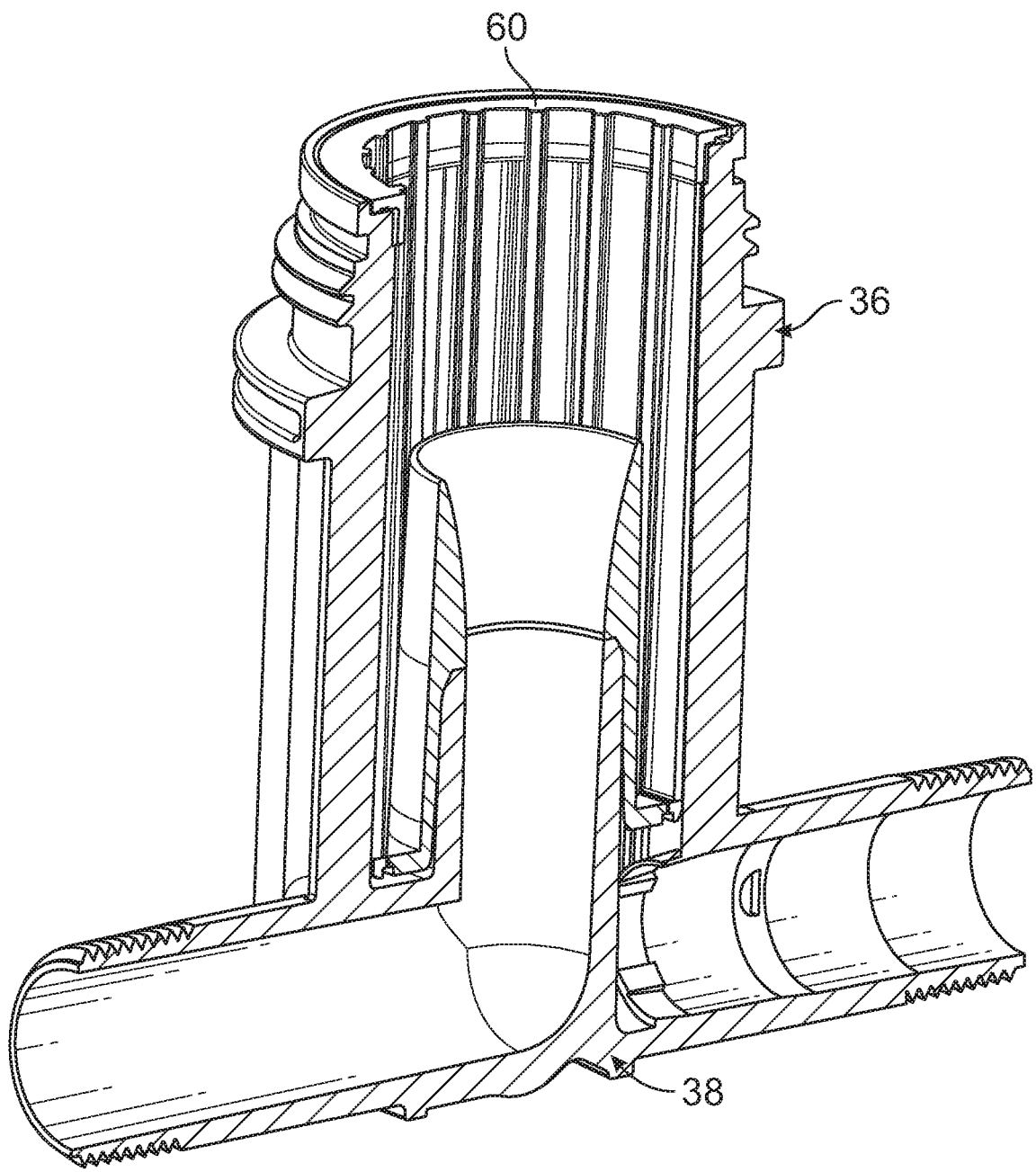
FIG. 5 is a cross-section view of a body of the flow sensor of FIG. 1 and the combined filter and flow guide of FIG. 7 taken along line 2-2 of FIG. 1.

The upper portion 36 may be generally cylindrical in shape and has a generally perpendicular orientation relative to the base portion 38. The body 18 and the cover 40 form a large chamber 52, and the top cover 40 defines a small chamber 54 that extends into the large chamber. The large chamber 52 houses a filter 56 and a flow guide 58. The filter 56 and the flow guide 58 may be a single piece flow guide/filter body 60 (e.g., FIG. 3).

Figure 6:
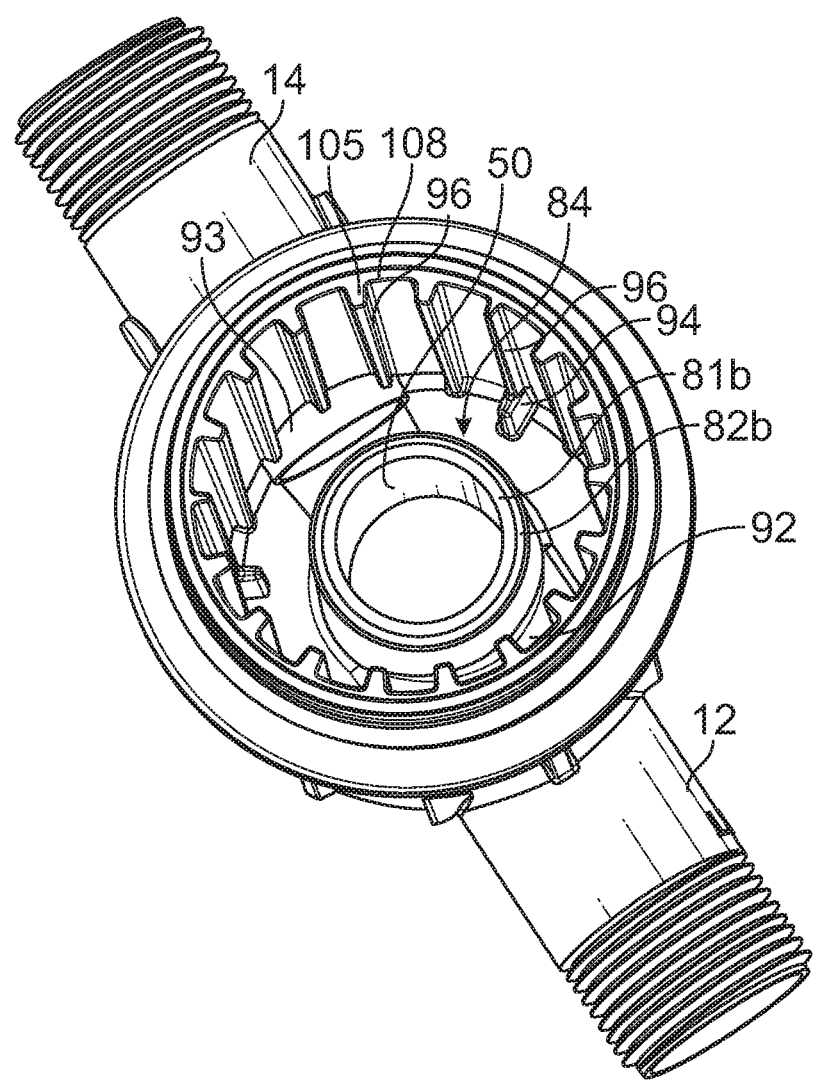
FIG. 6 is a top perspective view of the body of FIG. 5 without the combined filter and flow guide.
Figure 7:
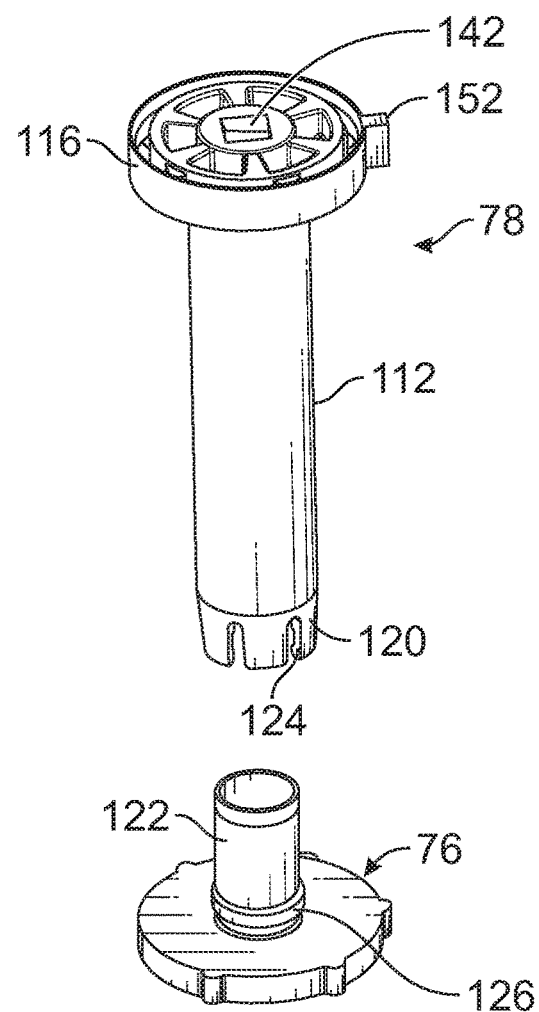
FIG. 7 is a side perspective view of a piston of the flow sensor of FIG. 1.
Figure 8:
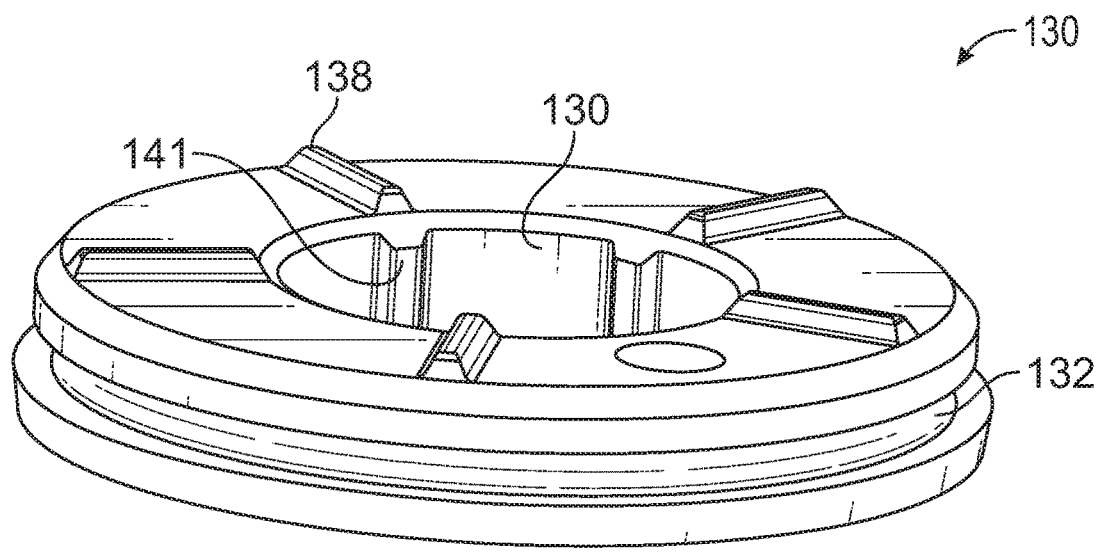
FIG. 8 is a side perspective view of a plug of the flow sensor of FIG. 1.

As shown in FIGS. 2-6, the flow guide 58 includes a tubular lower portion 62 with an annular inner wall 64 that taper slightly inwards from a base 66 of the flow guide 58 to a transition portion 68 of the flow guide 58. The flow guide 58 also includes a tubular upper portion 70 with an annular inner wall 72 that tapers inward from an upper edge 74 down to the transition portion 68 of the flow guide 58. The rate of taper of the tubular lower portion 62 is smaller than the rate of taper of the tubular upper portion 70. More specifically, the rate of taper of the tubular lower portion 62 might be relatively negligible for the function of the flow meter 20 and might be virtually zero, leaving only enough taper to accommodate the molding process. The rate of taper for the tubular upper portion 70 can be set at any desired rate; however, it is generally bounded by the radial and vertical space available in the portion of the chamber 52 inside of the filter 56 and the diameter of a head 76 of a piston 78 (FIG. 7). In addition to the taper, the annular inner wall 72 of the upper portion 70 also could have an outward curvature to it as it proceeds from the transition portion 68 to the upper edge 74. The radius of curvature might be constant or it might be varying along the upper portion 70. In a varying configuration, the radius of curvature could be decreasing along the annular inner wall 72 progressing from the transition portion 68 to the upper edge 74. The function of the tubular upper portion 70 can be mainly controlled by a spring constant of a spring 80 (FIG. 2) as opposed to the rate of taper and radius of curvature. In one embodiment, the rate of taper of the annular wall 110 of the lower portion 50 could be 0.0283 in/in or 1.50 degrees, the rate of taper of the annular wall 72 could be 0.2424 in/in or 18.66 degrees, and the radius of curvature of the annular wall 72 could be 3.15 inches. The spring constant could be 0.503 lbs/in, and the diameter of the head 76 could be 0.910 in.

The tubular lower portion 62 has a slightly larger inner diameter than an outer diameter of the upwardly directed tubular portion 50 of the inlet passage 12 so that the tubular portion 62 can slide on to the outside of the tubular portion 50 with a friction fit that forms a seal. The transition 68 includes a chamfered surface 81*a* and a stepped surface 82*a* that engage complimentary surfaces 81*b*, 82*b* on a terminal end 84 of the tubular portion 50 of the inlet 12.

The flow guide/filter body 60 may be molded as a single piece, or it may be assembled with multiple components. For example, the flow guide 58 may be a separate component affixed to the filter body 56. The flow guide/filter body 60 includes an annular base 86 of the filter 56. The annular base 86 defines slots 88 configured to receive tooling to hold the mesh screen 90 during the molding process. A portion of the annular base 86 seats on a ledge 92 of the inlet 12, a ledge 93 of the outlet 14 and terminal ends 94 of ribs 96 that extend radially inward from the upper portion 36 near the base portion 38 (FIG. 6).

The filter 56 has supports 98 extending longitudinally from the annular base 86 to an annular top 100 of the filter 56. The supports 98 may be parallel and equally spaced from one another about the diameter of the annular base 88 and the annular top 100. The supports 98 may have a rectangular cross-sectional shape or some other shape, such as a cylindrical, triangular or a trapezoidal cross-section. The supports may be spaced close enough to one another to provide filtering themselves.

The top 100 may have a lower ring 102 and an upper ring 104. The upper ring 104 may have a larger outer diameter than the lower ring 102. The upper ring 100 may define notches 106 equally spaced about the diameter of the upper ring 104. The upper ring 104 seats on an annular recess ledge 108 of the upper portion 36 of the flow body 38 and tops 105 of the ribs 96. Notches 106 extend radially from the annular base 86 and may form vents. The top cover 40 includes an annular wall 131 that engages the filter 56 to hold the filter 56 in place in the lower chamber 52.

The mesh screen 90 could be fixed inside the filter 56 to the lower ring 102, the annular base 86 and the filter support elements 98. For example, the mesh screen 90 could be over-molded onto the lower ring 102, the annular base 86 and the filter support elements 98. The mesh screen 90 forms holes that are sized to filter desired debris, such as that commonly flowing through irrigation water. Alternatively, the mesh screen 90 could be a cylinder that slides into the filter body 56. Also, the mesh screen 90 could be mounted to the outside of the filter body 56.

With reference to FIGS. 2 and 7, the piston 78 operates in the both the large and small chambers 52, 54. The piston 78 includes a shaft 112 with a hollow interior 114, a coupler 116, and a piston head 76. The coupler 116 is fixed to the shaft 112. The piston head 76 operates in the flow guide 56 and fits into the tubular portion 50 of the inlet passage 46 with a slight clearance so that fluid can flow around the piston head 76 to be more sensitive to low flow rates so that they can be measured when the piston head 76 is in the tubular portion 50 overlapped with filter/flow guide 58. The clearance between the piston head 76 and the inside diameter of the tubular portion 50 may preferably be approximately 0.020 inches, but other clearances, smaller and larger, will also work as well.

The piston head 76 may be attached to the shaft 112 using a set of fingers 120 extending from the shaft 112 engaging a tubular portion 122 of the piston head 76. Each of the fingers 120 has a notch 124 that receives an annular bead 126 of the tubular portion 122. Each finger 120 can bend radially outward to receive the annular bead 126 and radially inward to lock against the head 126. Alternatively, the fingers could extend from the tubular portion and the annular bead could be about the shaft, or the notch and bead could be on the tubular portion and the fingers, respectively.

As shown in FIGS. 8-12, a tubular portion 128 of the top cover 22 forming the upper chamber 54 attaches to a washer or plug 130. The washer 130 is disposed below the coupler 116 of the piston 78. When there is no flow, the coupler 116 rests on the washer 130 (FIG. 2). The washer 130 has a series of recesses 132 to reduce the amount of material used in manufacturing. The tubular portion 128 of the top cover 22 has flexible fingers 134. Each flexible finger 134 has a lip 136 that clips into an annular recess 140 formed about the washer 130 and snaps the tubular portion 128 securely to the washer 130. The top of the washer 130 includes radial extending ribs 138. Each flexible finger 134 can bend radially outward to be received in the annular recess 140 and radially inward to lock in the annular recess 140.

With reference to FIGS. 2, 7, 8, and 12, the piston head 76 is centered in the flow guide 58 by a wall 110 of the tubular portion 50 of the inlet passage 12. When fluid is flowing through the flow guide 58, the wall 110 of the tubular portion 50 permits the piston 118 to move up and down linearly with minimal or no friction therebetween. Fluid also flows around the piston head 76 through the flow guide 58. The piston head 76 includes axially extending ribs 77 to engage the tubular portion 50 to maintain the piston head 76 centered, reduce friction and allow fluid flow around piston head 76.

The shaft 112 extends through a center hole 139 in the washer 130 and will reciprocate in the small chamber 54 of the tubular portion 128 as the piston 78 moves. The washer 130 includes ribs 141 in the center hole 130 that engage and guide the shaft 112 with minimal friction. The coupler 116 defines a square hole 142 at its center. The hole 142 make take on some other shape, such as a rectangular or a triangular. The rectangular hole 142 is of a slightly larger size than the cross-sectional dimensions of a twisted shaft 144. The cross-sectional shape can have a corresponding shape of the twisted shaft 144 to the hole 142. As the rate of fluid flow increases in the flow meter 20, the coupler 116 will move up the twisted shaft 144, and the twisted shaft 144 will be received in hollow interior 114 of the shaft 112. As a result of this linear motion of the piston 78 along the twisted shaft 144, the twisted shaft 144 will rotate because of the cooperating engagement of the hole 142 and the twist in the twisted shaft 144.

Figure 9:
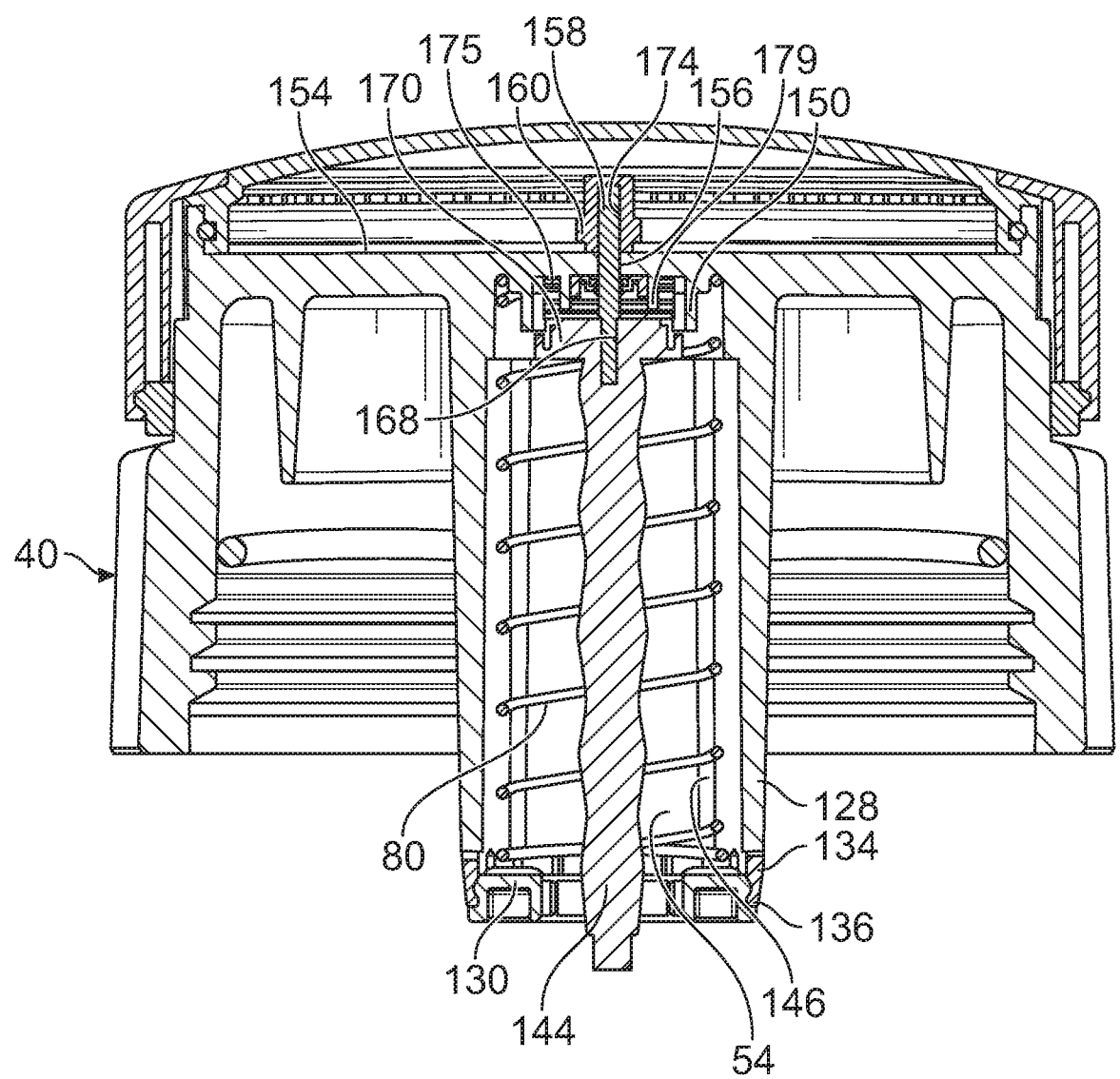
FIG. 9 is a cross-section of a gauge of the flow sensor of FIG. 1 taken along line 9-9 of FIG. 18.
Figure 10:
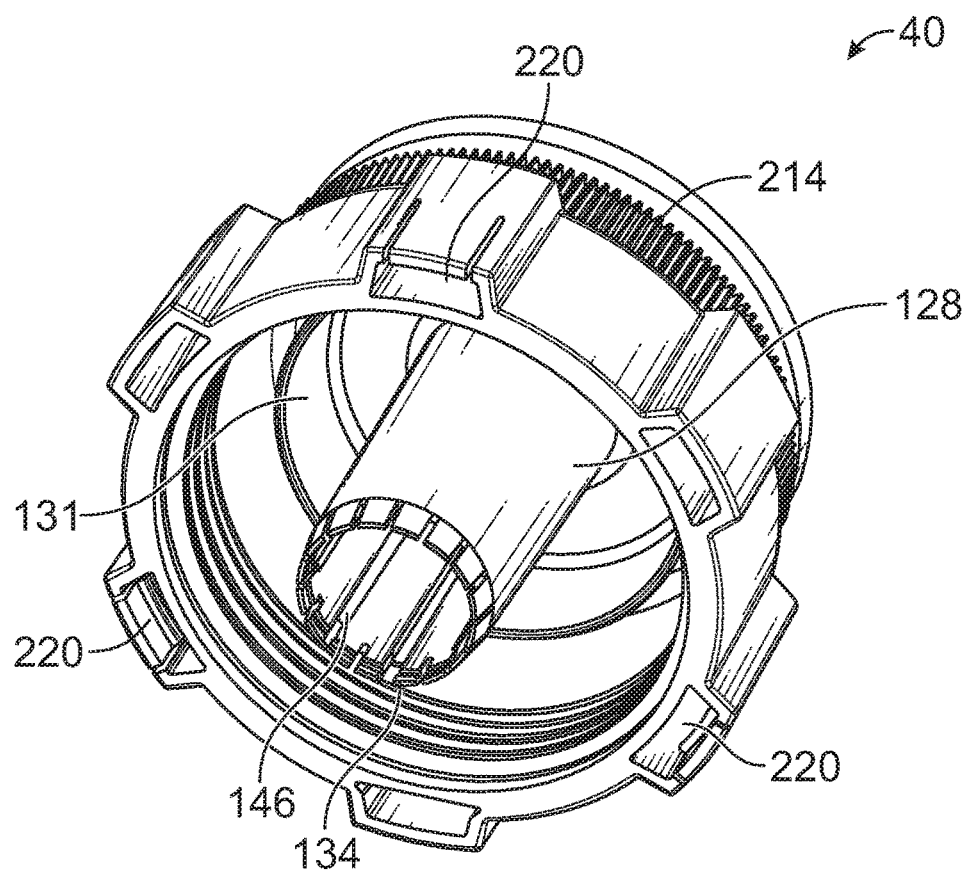
FIG. 10 is a bottom perspective of a cover of the flow sensor of FIG. 1.

As shown in FIGS. 2 and 9, the tubular portion 128 houses the helical spring 80 and the twisted shaft 144 in the small chamber 54. The tubular portion 128 may include ribs 146 that run longitudinally therein. The ribs 146 provide a smaller surface that, in turn, reduces friction so that the helical spring 80, the shaft 112 and the coupler 116 reciprocate freely in the chamber 54 and are maintained in a linear operating configuration. This aides in maintaining the piston 78 centrally located in the flow guide 58 and the tubular portion 50 of the inlet passage 46.

As fluid flows through the inlet passage 46 and pushes on the piston head 76, the piston 78 is biased downward by the helical spring 80. The upward displacement of the piston 78 depends on the rate of flow of the fluid into the inlet passage 46. A higher flow rate will move the piston head 78 further into the tubular portion 128 of the top cover 40 than a lower flow rate. If there is no water flow, the shaft 112 will not extend into the tubular portion 128. The tubular upper portion 70 of the flow guide 58 may include longitudinally extending ribs (not shown) that are wedged shaped and that engage and guide the piston head 76 as it reciprocates. The ribs would increase radially as one moves along the rib toward the upper edge 74 of the upper portion 70. The ribs also may ensure clearance for fluid to pass around the piston head 76 and low friction surfaces for the piston head 76 to move on as it reciprocates.

With reference to FIG. 9, the top of the tubular portion 128 has a first annular wall 150 extending axially into the chamber 54. The coupler 116 cannot extend beyond the annular wall 150. The outer diameter of the first annular wall 150 is smaller than the inner diameter of the helical spring 80, and the inner diameter of the tubular portion 128 is larger than the outer diameter of the helical spring 80. Therefore, as the coupler 116 moves upward in the chamber 54, the helical spring 80 can coil up, compress and collect around the first annular wall 150 and inside the tubular portion 128. The other end of the spring 80 rests on the radial ribs 138 of the washer 130.

Figure 11:
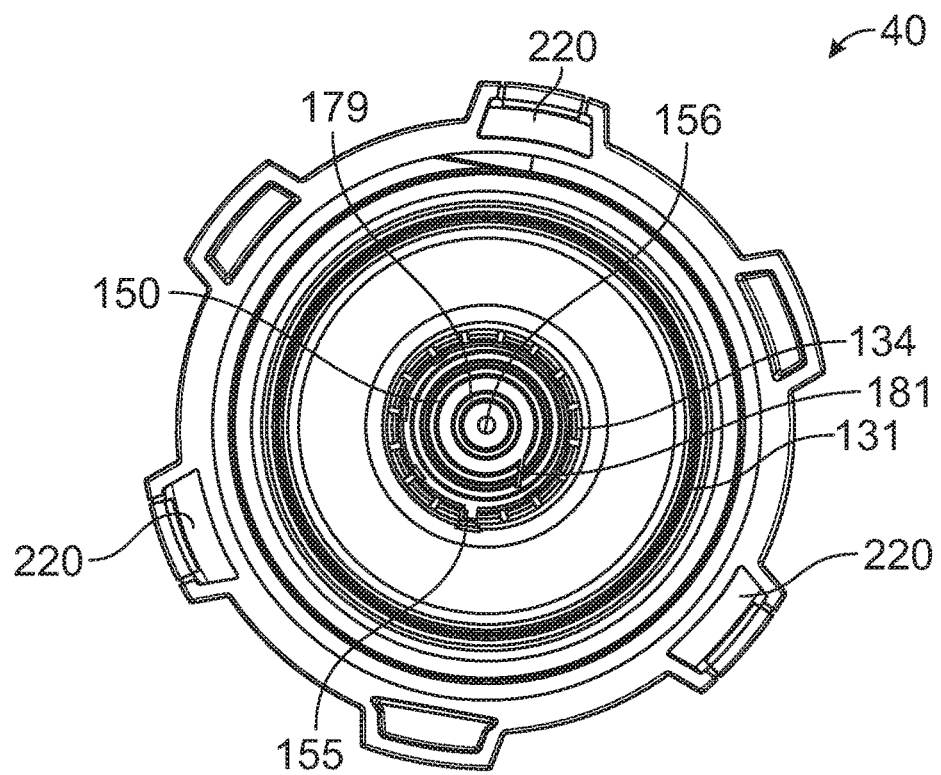
FIG. 11 is a bottom plan view of the cover of FIG. 10.
Figure 12:
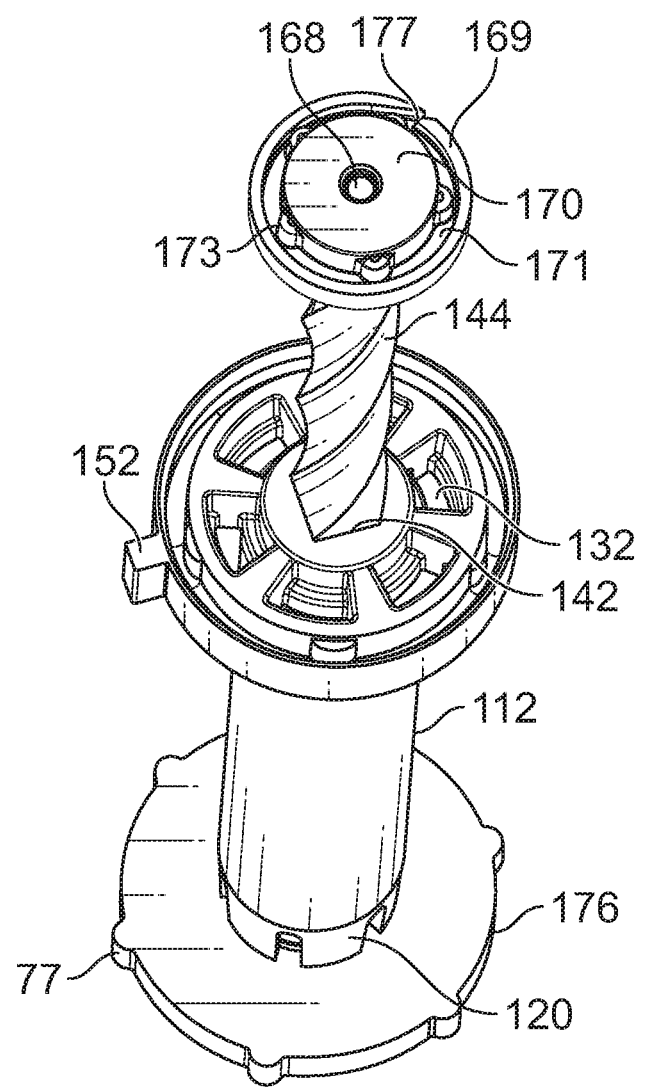
FIG. 12 is a top perspective view of a twisted shaft, coupler and piston of the flow sensor of FIG. 1.
Figure 13:
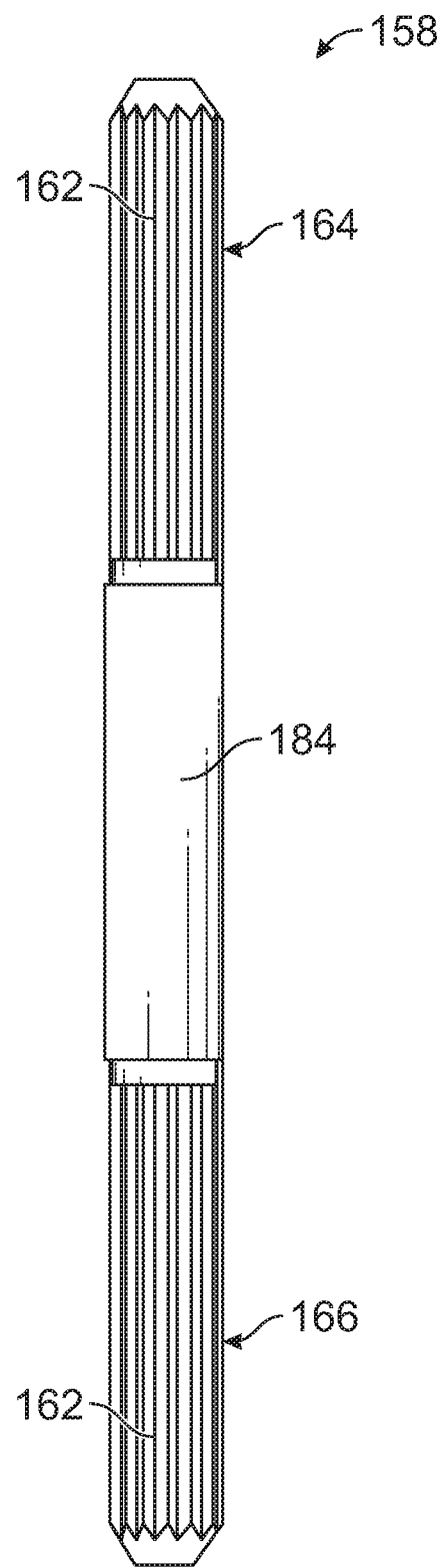
FIG. 13 is a side perspective view of a spindle of the flow sensor of FIG. 1.
Figure 14:
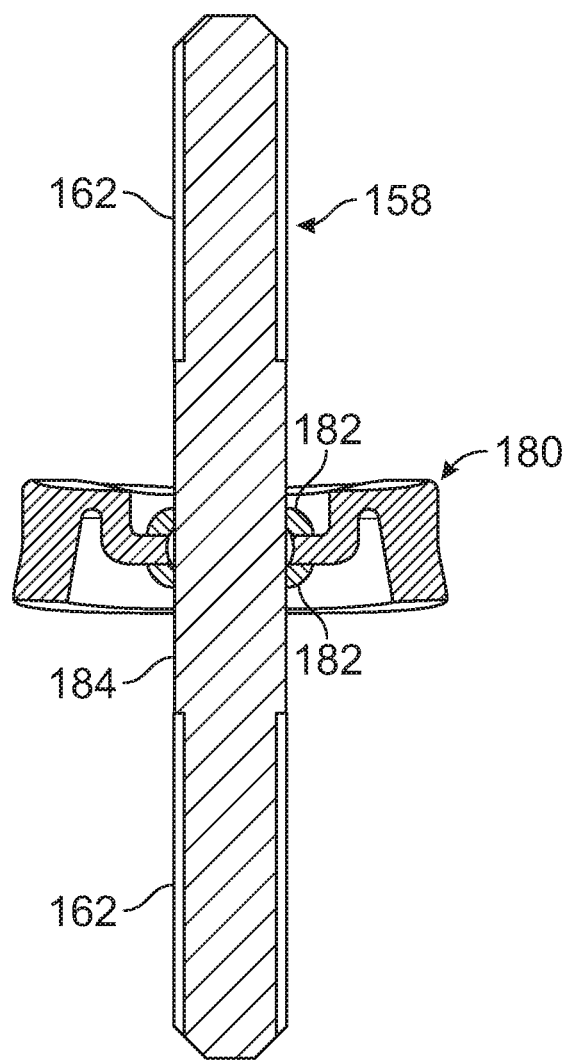
FIG. 14 is a central cross-section view of the spindle and annular seal of the flow sensor of FIG. 1.

As illustrated in FIGS. 7, 11, and 12, a rib or tab 152 of the coupler 116 slides in an axially extending groove 155 in the wall of the tubular portion 128. This prevents the piston 78 from rotating in the flow sensor 10.

With reference to FIGS. 9 and 11-14, the tubular portion 128 terminates at a top portion 154 of the top cover 40. The top portion 154 defines a hole 156 that permits a spindle 158 to connect the twisted shaft 144 to a needle or pointer 160. The spindle 158 has ridges or serrations 162 about an upper portion 164 and a lower portion 166. The lower portion 166 fits in a bore 168 of a boss 170 of the twisted shaft 144 with a friction fit, and the ridges 162 penetrate the surface of the boss 170 forming the bore 168 to prevent rotation of the spindle 144 within the bore 168.

An annular wall 169 surrounds the boss 170 and forms an annular recess 171 about the bore 170. Axially extending ribs 173 protrude from the boss 170 into the annular recess 171. A first end of a second spring 175 seats in the annular recess 171 between the annular wall 169 and the ribs 173. A tail of the second spring 175 extends through a break 177 in the annular wall 169 to hold the second spring 175 in place. A second annular wall 179 extends axially into the chamber 54 from the top portion 154. The second annular wall 179 is inside of the first annular wall 150, making the first and second annular walls 150,179 concentric. The other end of the second spring 175 engages the top portion 154 between the first and second annular walls 150,179. The first annular 150 wall includes a break 181 for the other tail of the second spring 175 to extend through. The second spring 175 helps hold the twisted shaft 144 down and take any play out when the needle 160 is in the no-flow position. The second spring 175 is optional.

The upper portion 164 of the spindle 158 is received in a bore 174 of the needle 160 to form a friction fit connection. The ridges 162 penetrate the inner surface of the needle 160 forming the bore 174 to secure the needle 160 to the spindle 158 and prevent rotation of the spindle 158 within the bore 174 of the needle 160. Therefore, as the spindle 158 rotates due to the rotation of the twisted shaft 144, the needle 160 rotates at the same rate as the spindle 158.

As illustrated in FIGS. 9 and 13-15, the second an annular wall 179 of the tubular portion 128 houses an annular seal 180. The seal 180 has redundant wipers 182 that wrap around and engage a smooth portion 184 of the spindle 158 to prevent water from exiting the upper chamber 54 through the hole 156 of the top cover 40.

Figure 16:
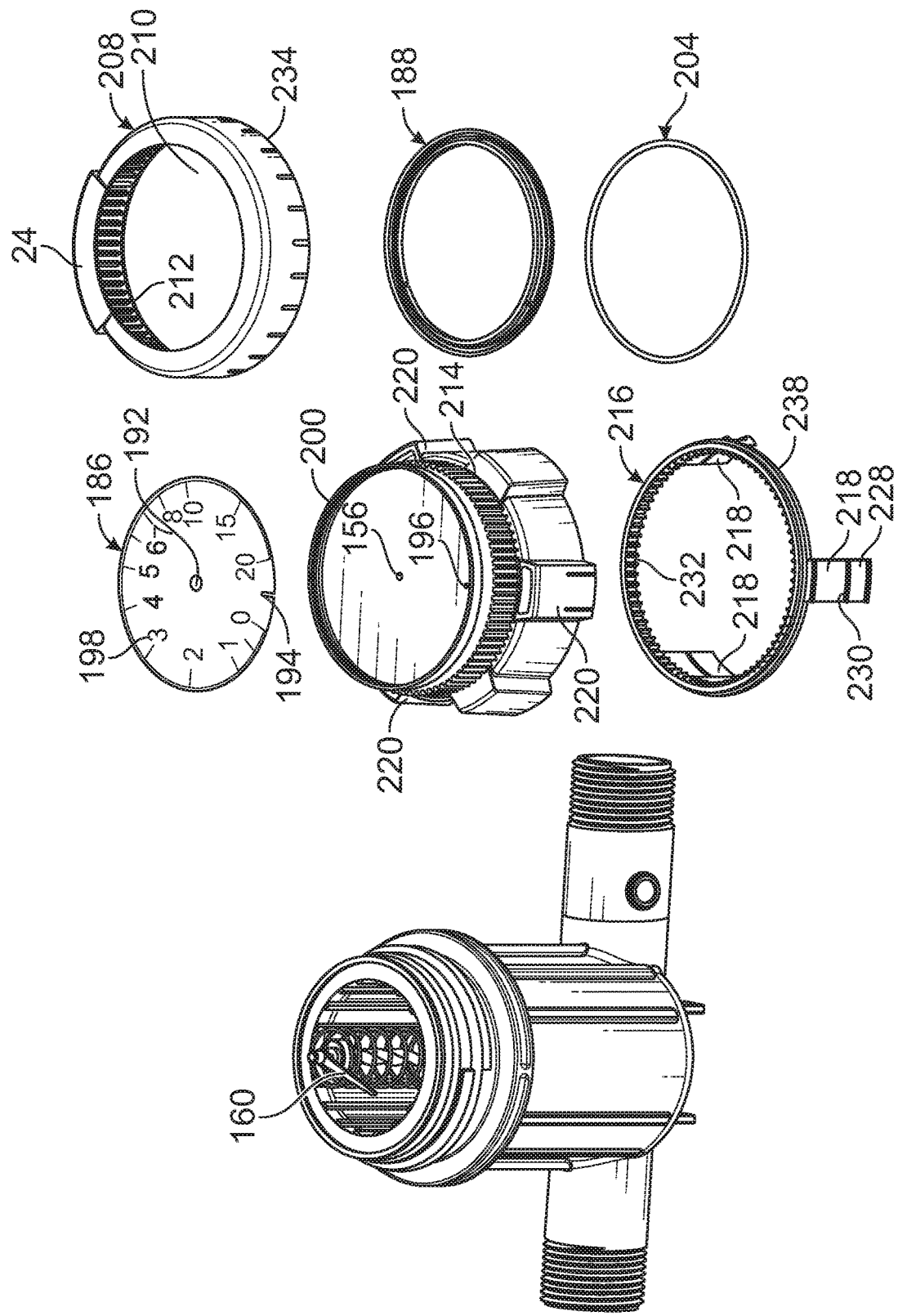
FIG. 16 is a partial exploded view of the flow sensor of FIG. 1.

Referring to FIG. 16, the gauge 22 includes a gauge plate 186 and a transparent cover 188. The gauge plate 186 sits in a recess 190 defined by the cover 40. The gauge plate 186 defines a hole 192 that aligns with the hole 156 of the cover 40 to allow the spindle 158 to extend therethrough. The gauge plate 186 includes a slot 194 that receives a tab 196 in the recess 190 to prevent the gauge plate 186 from rotating. The gauge plate 186 may be marked with indicia or indicators 198 representing a fluid condition, such as the rate of flow of the fluid through the flow meter 20. For instance, the gauge plate 186 may have indicia 198 indicating a scale for fluid flow in gallons per minute (gpm) and/or liters per minute. As the flow rate increases, the pointer 160 will rotate clockwise as viewed from above the flow sensor 20.

The arcuate distance between the indicators may vary depending on the flow guide. As illustrated, the distance between numbers 5-20 is less than that between the other numbers and gradually becomes smaller between each number 5 to 20. This is to account for the smaller movements of the piston head 76 through the upper portion 70 of the flow guide 58 as opposed to the constant movement through the tubular portion 50. More specifically, the piston head 76 will move through the tubular portion 50 with a travel rate that has a linear relationship with the flow rate. In the upper portion 70, the travel rate of the piston head 76 will slow because of the gradually increasing gap about the piston head 76. As the travel rate slows, the circumferential travel of the needle 160 will decrease; thus, the numbers on the gauge plate 186 will need to become closer as the flow increases to account for the non-linear relationship.

The indicia on the gauge plate 186 can be altered by changing the spring constant of the first spring 80 and/or the twist of on the twisted shaft 144. For example, to increase the flow range of the flow sensor, the spring constant could be increased by using a stiffer spring. This will increase the preload on the piston 78.

To make the flow sensor more sensitive, the twist rate along the twisted shafted could be increased. For example, assume (1) the desired flow rate range of the flow sensor is 0 to 30 gpm, (2) the desired operating flow rate for the system is 20±5 gpm, and (3) the upper end of the flow rate range is more important to monitor. Therefore, it would be desired to increase the sensitivity of the flow sensor at the upper range of the flow rate (i.e., 20 to 25 gpm). One way to accomplish this would be to increase the twist rate along the upper portion of the twisted shaft, leaving the lower portion with a lower twist rate. More twists per length will cause the needle 160 to rotate more on the gauge plate 186 with less axial movement of the piston 78.

Figure 21:
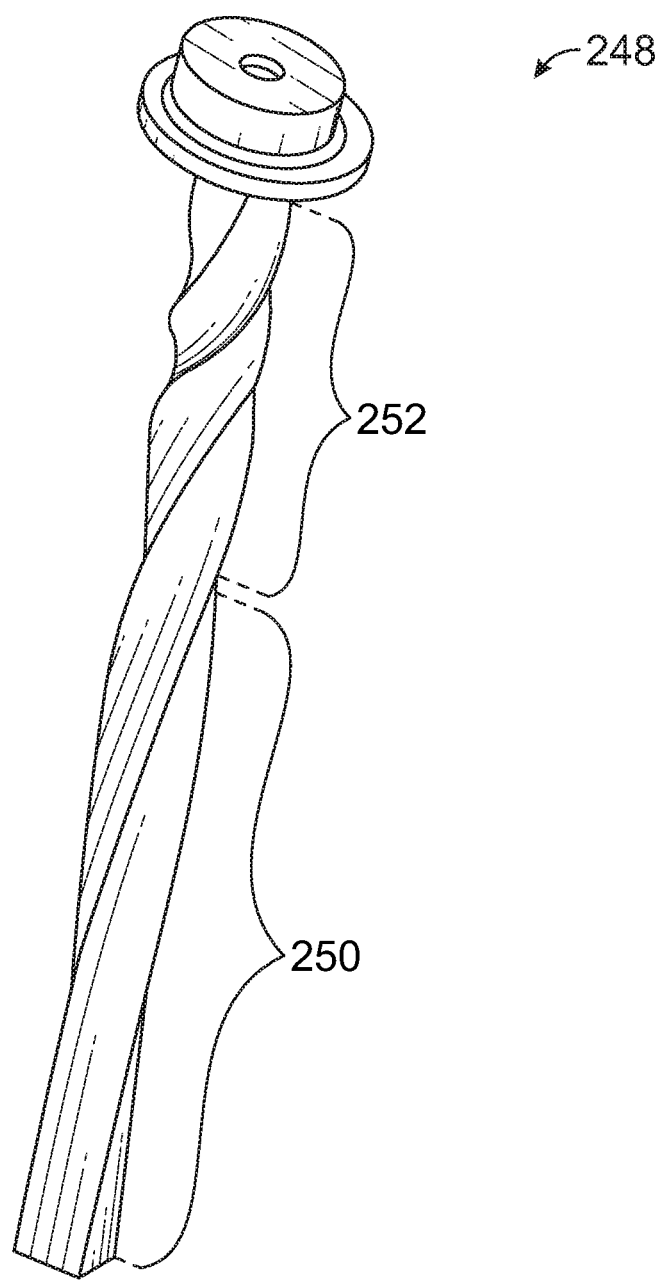
FIG. 21 is a side perspective of another twisted shaft that may be used with the flow sensor of FIG. 1.
Figure 22:
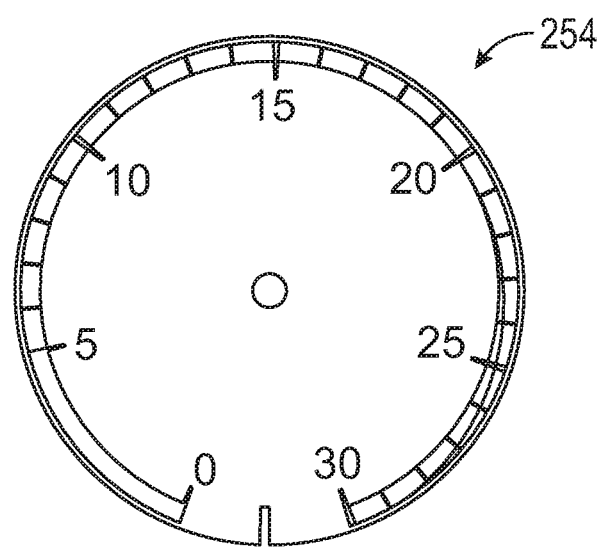
FIG. 22 is a top plan view of another flow gauge plate that may be used with the flow sensor of FIG. 1.

With reference to FIG. 21, there is illustrated a twisted shaft 248 with varying twist rates along the entire length. For reference, a bottom portion 250 and a top portion 252 are indicated. When used in the flow sensor described above, a gauge plate 254 with constant spacing between the numbers for 0 to 30 gpm can be used, as illustrated in FIG. 22. With the twisted shaft 248, the numbers 0 to 5 gpm is produced by the bottom portion 250 and above 5 gpm is produced by the top portion 252. Thus, the transition between the bottom and top portions 250,252 occurs around 5 gpm.

The following provides an example of a method for determining the varying twist along the twisted shaft 248 to make the twisted shaft 248 to be used with the gauge plate 254 having a range for measuring flow rates up to 30 gpm. The range of sweep for the needle 160 on the gauge plate 254 can be set to 300 degrees (0 degrees being 0 gpm and 300 degrees being 30 gpm). This results in 0.1 gpm/deg.

In this example, the displacement of the piston 78 from 0 gpm to 30 gpm is 1.6 in, so the degrees of sweep for the needle 160 per one inch of piston 78 displacement is 187.5 deg/in (300 deg/1.6 in). Next, the piston displacement can be broken into 16 segments of 0.1 in, so the degrees of sweep for the needle per 0.1 in piston displacement is 18.75 deg (187.5 deg/in×0.1 in). It should be understood that the piston displacement can be broken down into more increments if desired for additional resolution. Knowing that the sweep on the gauge plate is 0.1 gpm/deg, a piston displacement of 0.1 in equals 1.875 gpm (18.75 deg×0.1 gpm/deg). Thus, the needle 160 moves 187.5 deg for every 0.1 in of piston displacement.

Using a conventional computation fluid dynamics software (e.g., SolidWorks® from Dessault Systemes SolidWorks Corporation), and conventional modeling and analytics techniques, it can be determined that the load at 30 gpm and 1.6 in of piston displacement is 1.764 lbf. With the load, the spring rate can be calculated to be 1.102 lbf/in. (1.764 lbf/1.6 in).

With the spring rate known, a table of forces/loads of the fluid flow needed to move the piston in 0.1 in increments can be calculated. For example, to move the piston 0.2 in, the calculated load would be 0.2205 lbf (1.102 lbf/in×0.2 in). These calculations are shown in FIG. 24 in the column labeled "Calculated Force."

Using the Calculated Forces of FIG. 24, and the same conventional computation fluid dynamics software, the flow simulation feature is used to iterate and determine the corresponding flow rate. For instance, the calculated flow rate for a load of 0.110266, which corresponds to a piston displacement of 0.1 in is 1.496 gpm. Similarly, the flow rate is 2.264 gpm at 0.2 in of displacement, 2.968 at 0.3 in of displacement, etc. The tables of FIGS. 25A-25G illustrate the flow rates up to 1.6 in of piston displacement.

More specifically, in the case of the SolidWorks® flow simulation feature, the program was provided the fixed load and a flow rate range. The program does an iteration on the flow rate until the load calculated by the program is within a specified delta from the load calculated using the spring rate. A specified delta in this case can be 0.01 in. The model for the twisted shaft needs to be created with the correct piston position. To do so, for example, the program can be provided with the expected load at 0.1 in piston displacement and a flow rate range of 0.5 gpm to 3 gpm. Then, the program will calculate the load at the upper flow rate, which should give a higher load, and at the lower flow rate, which should give a lower load. These loads are compared to the target load and should bracket the target load. The program will then select a flow rate between the high and low initial values. For example, the program might choose 1.2 gpm and recalculate the load. The program then compares the calculated load value to the target load, and if it is not within the given delta, it will select another load and recalculate the load. This is done until the load is close to the target load. This is repeated at every 0.1 inches up to 1.6. The tables of FIGS. 25A-25G were created from data created by this function. The loads in the emphasized cells were selected, and the corresponding flow rate was used in the column labeled "Calculated GPG @ Piston Position X, Fluid Analysis" of FIG. 26. For example, for piston position 0.1 in, the load of 0.10088 lbf was selected because it was within the set deviation from 0.110266 lbf, and thus, the corresponding flow rate of 1.496 gpm was used for the y-axis data in FIG. 26.

Figure 27:
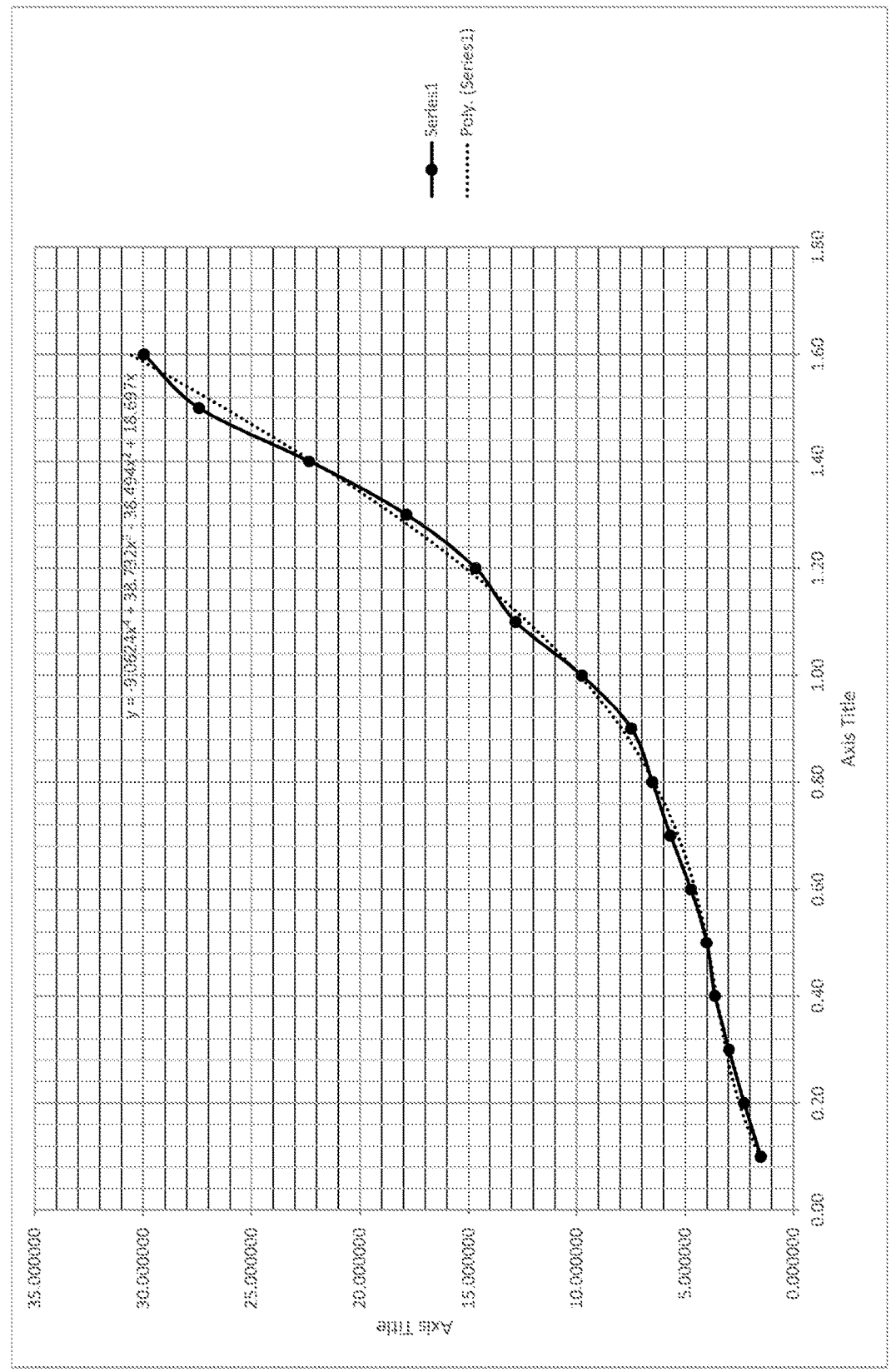
FIG. 27 is a plot used to model the twisted shaft of FIG. 21.

The values for flow rate versus piston position can be plotted and a trend line can be fitted which gives a $4^{th}$ order equation. The plotted data is shown in the first two columns of FIG. 26. The "Piston Position, X" data is the x-axis, and the Calculated GPG @ Piston Position X, Fluid Analysis is the y-axis. The $4^{th}$ order equation can be used to determine the actual displacement for a given flow rate. For example, using the $4^{th}$ order equation, the expected displacement would be 0.1312 in for a flow rate of 1.875 gpm, 0.4438 in for a flow rate of 3.75 gpm and so on up to 30 gpm and approximately 1.6 inches. This data is shown in FIG. 26 in the columns under the $4^{th}$ order equation labeled "Expected GPM @ Piston Position, balanced dial gage" and "Estimated displacement for expected GPM." The plot of the data and $4^{th}$ order curve is shown in FIG. 27, where the y-axis is the flow rate and the x-axis is piston displacement.

With this information, the twisted shaft can be created using a conventional modeling software (e.g., SolidWorks® from Dessault Systemes SolidWorks Corporation), by creating square sections at each displacement value and rotating each 18.75 deg between each. So, a total of 16 sections (or planes) rotated through 300 degrees, each one at a specific length along the shaft determined from the plot of FIG. 27. The lengths are shown in the $4^{th}$ order equation values under the column titled "Estimated displacement of expected GPM" of FIG. 26. A shape for the twisted shaft was lofted using the conventional modeling software from those sections to the obtain the complete variable twisted shaft.

Figure 17:
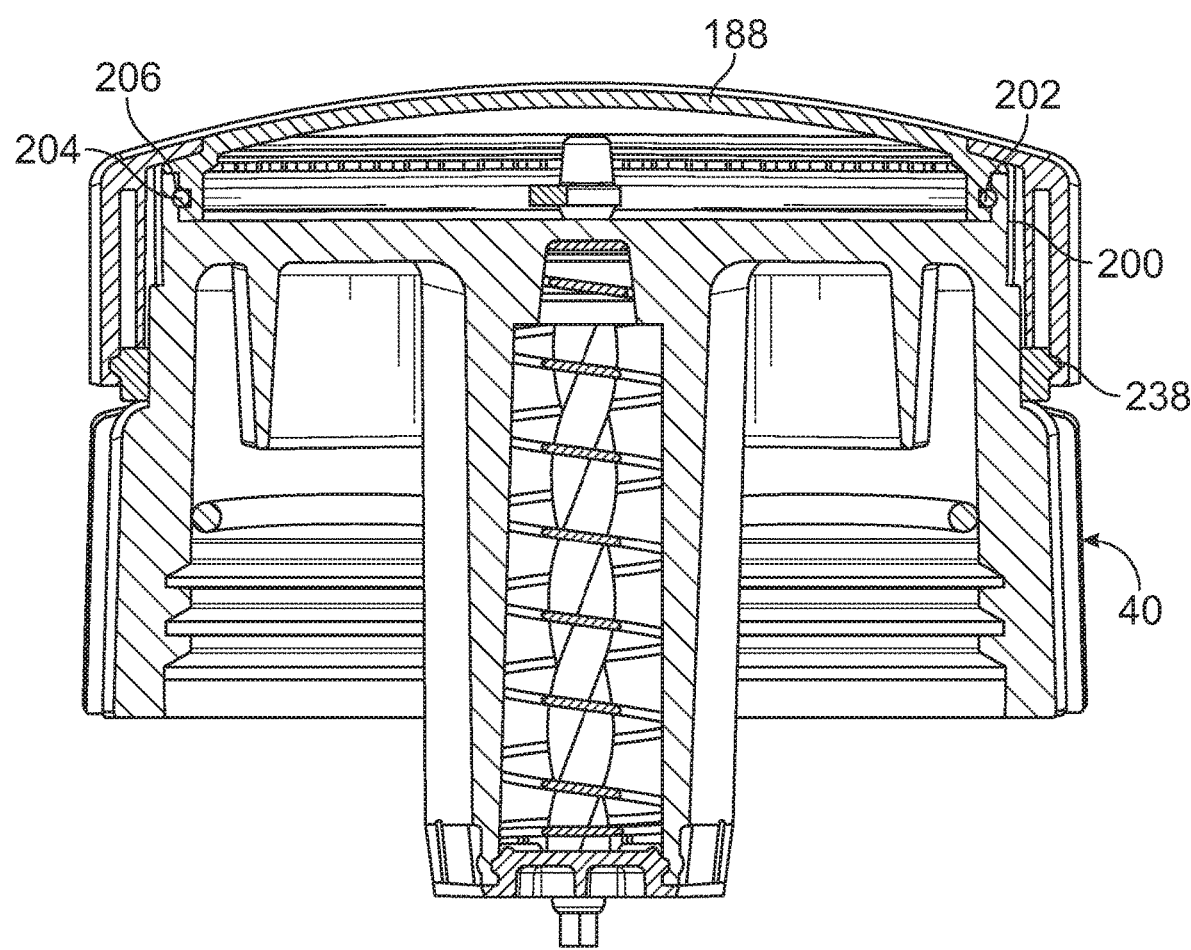
FIG. 17 is a cross-section view of a portion of the gauge of FIG. 1 taken along line 17-17 of FIG. 18.
Figure 18:
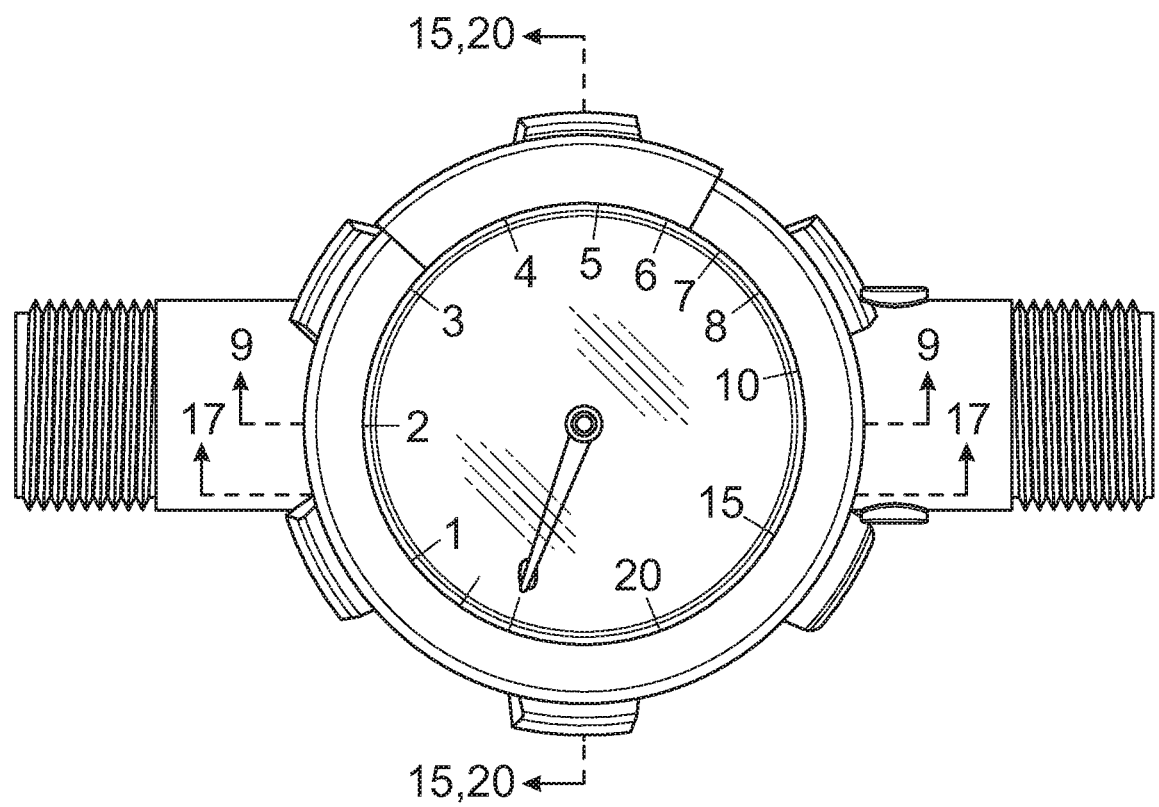
FIG. 18 is a top plan view of the flow sensor of FIG. 1.
Figure 19:
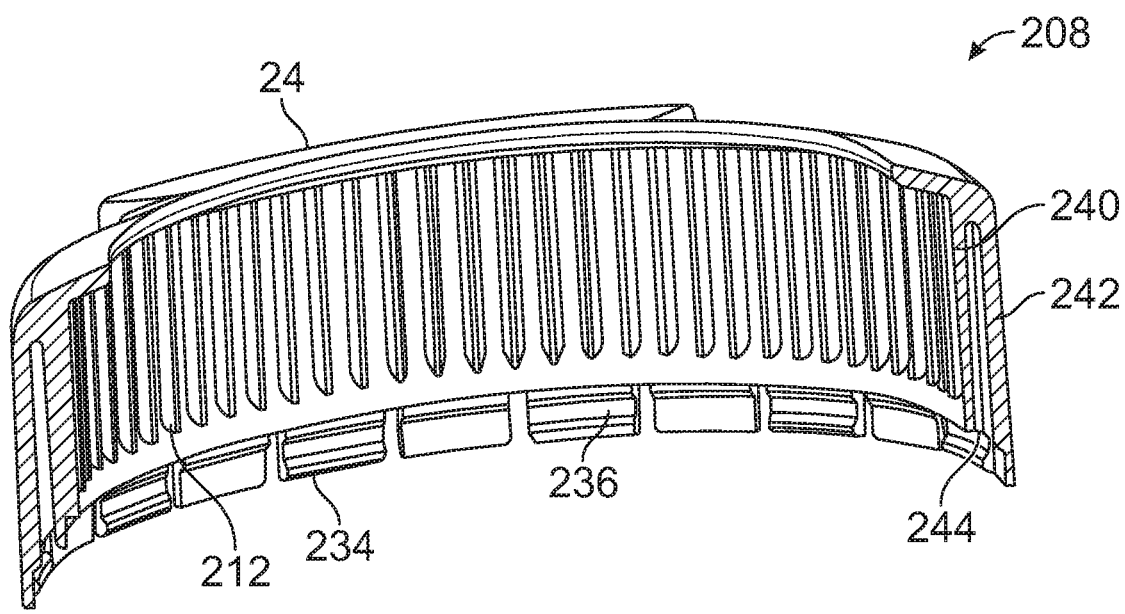
FIG. 19 is cross-section view of the dial of the flow sensor of FIG. 1.

With reference to FIGS. 16 and 17, the top cover 40 includes an annular wall 200 defining the recess 190 and an annular depression 202 in the annular wall 200. The transparent dial cover 188 fits in to the recess 190 of the top cover 40. An o-ring 204 seats in the annular depression 202 in the recess 190 of the cover 40 and is sandwiched between the annular depression 202 and an outer annular recess 206 of the transparent dial cover 188. The inter-engagement formed by the depression 202, o-ring 204 and the outer annular recess 206 locks the dial cover 188 in the recess 190.

As shown in FIGS. 1, 15, 16, and 18-20, the adjustable indicator 24 rides on a dial 208 that cooperates with the cover 40 to enable the adjustable indicator 24 to be moved around the perimeter of the gauge plate 186. The dial 208 defines a central opening 210 that aligns with the transparent cover 188 to enable a clear view of the gauge plate 186 and the needle 160. The dial 208 includes internal serrations 212 that engage complementary external serrations 214 on the outside of the cover 40. The engagement of the internal serrations 212 and the external serrations 214 lock the dial 208 and the adjustable indicator 24 in place against unintentional rotation.

A dial ring 216 interconnects the dial 208 to the cover 40. The dial ring 216 includes three tabs 218 that are received in three sockets 220 defined by the cover 40. Each socket 220 includes a step 222, a lower rib 224 and an intermediate rib 226. Each tab 218 includes a lower rib 228 and an upper rib 230. The dial 208 is permitted to move vertically up and down between an upper position permitting the dial 208 to be manually rotated and a lower position locking the dial 208 against longitudinal movement. In the upper position (FIG. 15), the dial serrations 212 are spaced above and disengaged from the cover serrations 214 to permit rotation of the dial 208. In the lower position (FIG. 20), the dial serrations 212 are meshed with the cover serrations 214 to prevent rotation of the dial 208.

The dial ring 216 includes internal serrations 232 that mesh with the serrations 214 of the cover 40 to prevent rotation in of the dial ring 216. The cover serrations 214 are long enough so that they maintain their engagement with the dial ring serrations 232 in both the lower and upper positions of the dial 208.

The dial 208 includes annular fingers 234 about its lower perimeter. At least every other finger 234 includes an arcuate recess 236 that hooks and interlocks with an annular ring 238 projecting radially outward about the dial ring 216 to connect the dial 208 to the dial ring 216. The interlocking engagement allows the dial ring 216 to be lifted with the cover 40 and permits the dial to be rotated about the dial ring 216, as the dial ring 216 is held against rotation by the meshed serrations 214, 232. In rotating the dial 208, the fingers 234 slide on the annular ring 238. The dial serrations 212 extend from an inner wall 240 that is concentric with an outer wall 242 of the dial 208. The fingers 234 extend from the outer wall 242. A bottom surface 244 of the inner wall 240 can engage a top surface 246 of the dial ring 216 to move the dial ring 216 downward with the dial 208 after setting the dial 208 to its position.

Figure 15:
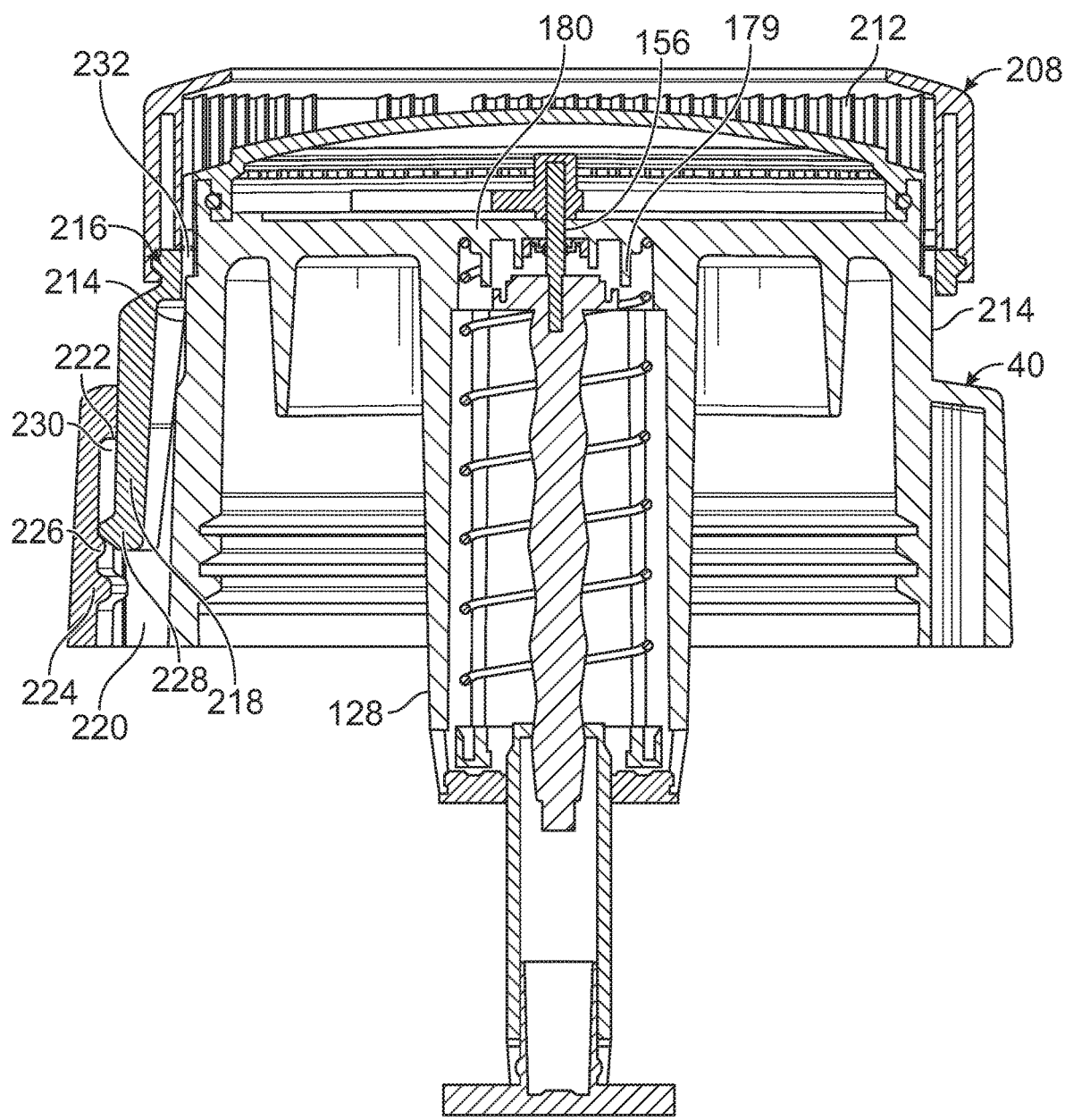
FIG. 15 is a cross-section view of a gauge of FIG. 1 taken along line 15-15 of FIG. 18 showing a dial in an unlocked state.
Figure 20:
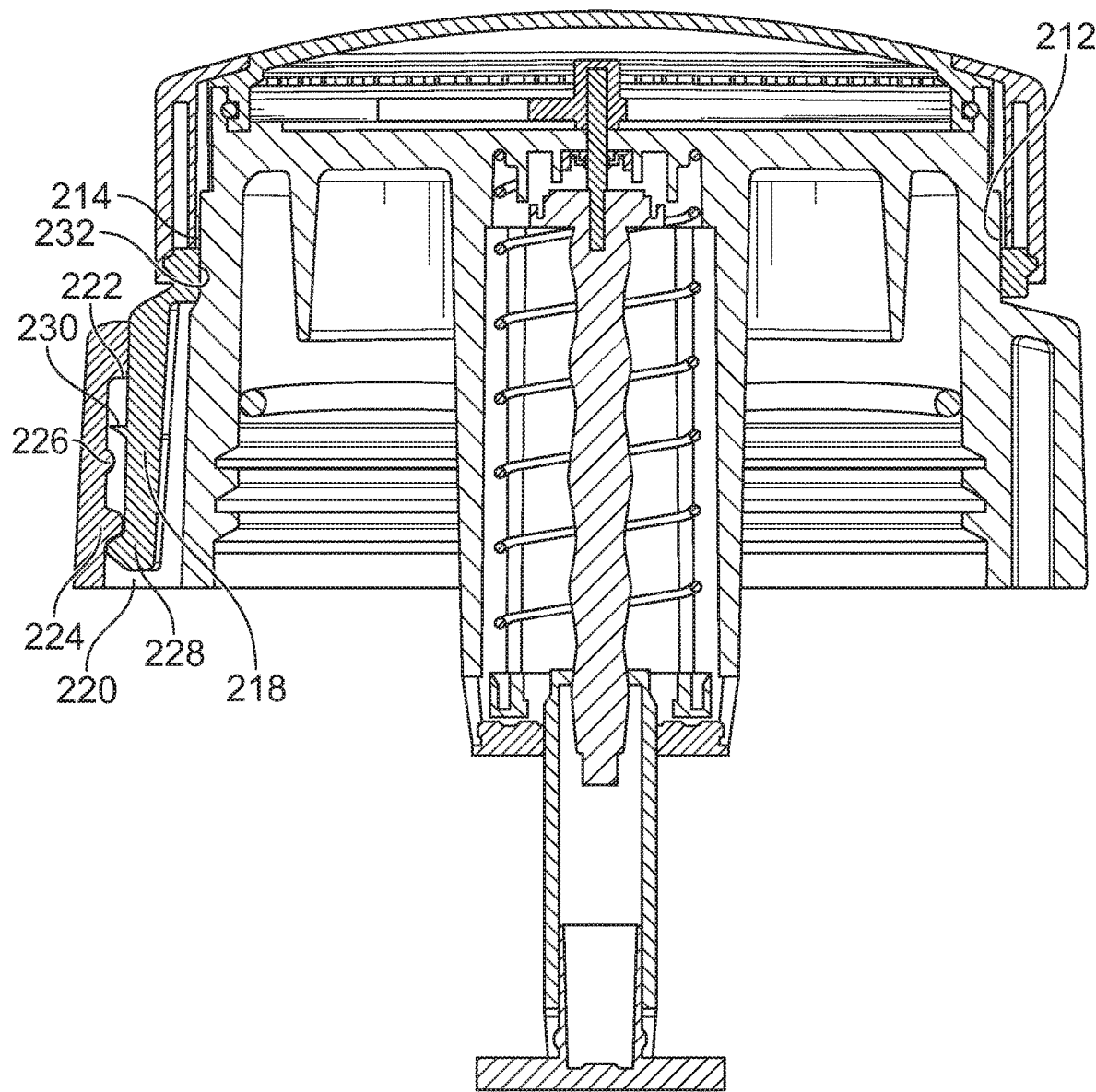
FIG. 20 is a cross-section view of the gauge of FIG. 1 taken along line 20-20 of FIG. 18 showing the dial in a locked state.

With reference to FIGS. 15 and 20, the tabs 218 of the dial ring 216 limit the upward movement of the dial 208. This prevents the dial 208 from being decoupled from the cover 40 when it is moved to an upper position for rotating to set the indicator 24. More specifically, the upward movement of the dial 208 is stopped upon engagement of the upper rib 230 of the tabs 218 with the arcuate step 222 of the respective socket 220 (FIG. 15). Moving from the lower position to the upper position, the lower rib 228 of the tabs 218 rides over their respective lower and intermediate ribs 224, 226 of the sockets 220. In the upper position, the lower rib 224 of the tabs 218 rest on their respective intermediate rib 226 of the sockets 220. This engagement maintains the dial 208 in the upper position for turning and repositioning of the dial 208.

Once repositioned, the dial 208 is pushed downward with the lower ribs 228 riding over their respective intermediate and lower ribs 226, 224 of the sockets 220. The engagement of the lower rib 228 on the tabs 218 with its respective lower rib 224 in the sockets 220 holds the dial 208 in the set position. The riding of the lower ribs 228 of the tabs 218 across their respective intermediate and lower ribs 226, 224 of the sockets 220 provides a tacit feel for a user of the dial 208 as the dial 208 is moved between the lower and upper positions. The intermediate ribs 226 may extend radially inward less than the lower ribs 224.

The amount of the travel permitted by the upper rib 230 of the tabs 218 and the step 222 of the sockets is coordinated so that in the upper position the internal serrations 212 of the dial 208 are above and disengaged from the external serrations 214 of the cover 40. As the dial 208 is moved between the upper and lower positions, the internal serrations 212 of the dial 208 and the internal serrations 232 of the dial ring 216 slide longitudinally in the external serrations 214 of the cover 40. In the lower (set position), the internal serrations 212 of the dial 208 and the internal serrations 232 the dial ring 208 are engaged with the external serrations 214 to prevent rotation of the dial 208. In the upper position, the internal serrations 212 of the dial 208 have moved beyond and are disengaged from the external serrations 214 of the cover 40. The serrations 232 of the dial ring 208 remain meshed with the external serrations 214 of the over 40 to prevent rotation of the dial ring 216.

The length of the serrations 212, 214, 232 and tabs 218 and the spacing of the lower and upper ribs 228, 230 of the tabs 218 and the step 222 and the lower rib 224 of the sockets 218 are coordinated to provide for the desired amount of travel to move the serrations 212, 214 of the dial 208 and the cap 40, respectively, in and out of engagement with one another, while maintaining the serrations 214, 232 in engagement. For example, the following exemplary measurements may be used:

| Measurement Description | Length (inches) |
| --- | --- |
| Length of serrations 214 of the cap 40 | 0.444 |
| Length of serrations 212 of the dial 208 | 0.577 |
| Length of serrations 232 of the dial ring 216 | 0.200 |

-continued

Figure 23:
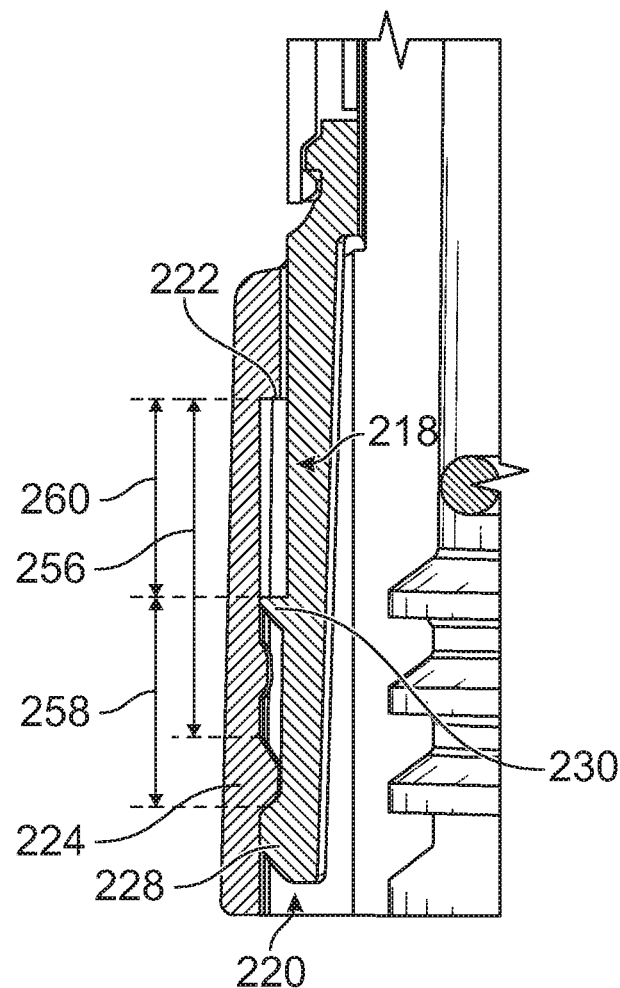
FIG. 23 is an enlarged portion of the cross-section view of FIG. 20.

| Measurement Description | Length (inches) |
| --- | --- |
| Distance between the step 222 and the lower rib 224 of each socket 220 (256, FIG. 23) | 0.580 |
| Distance between lower rib 228 and upper rib 230 of each tab 218 (258, FIG. 23) | 0.340 |
| Distance between upper rib 230 of the tab 218 and step 222 of each socket 220 when the dial 208 is in the locked position (260, FIG. 23) | 0.345 |

Dimensions and flow rates are only exemplary. The dimensions and conditions can be changed to accommodate measuring larger or smaller flows.

The adjustable indicator 24 indicates whether a certain condition, such as the flow rate through the flow sensor 10, is within the normal range defined on the adjustable indicator 24 or has either increased or decreased by some amount beyond the normal range. For example, the flow sensor 10 can measure small amounts of flow downstream of a valve, which may indicate a leak in the valve. The flow sensor 10 also can measure above normal flows, which may indicate damaged connections, conduit or water emission devices downstream. It also could measure below normal flow amounts which may indicate clogged conduit or water emission devices.

More specifically, if a normal flow through a system is 20 gpm, a user can move the center of the adjustable indicator 24 to indicate this flow rate as the normal operating flow for the system. As mentioned above, the adjustable indicator 24 can have color coded sections that designate different conditions. For example, the inner section 28 (which includes the center of the adjustable indicator) may be green indicating normal flow, and the two outer sections 26, 30 that straddle the inner section 28 may have other colors (e.g., yellow and red) indicating undesirable flow ranges. The transparent dial cover 188 permits the user to visually observe the needle or dial pointer 160 and the markings 198 on the gauge plate 186.

By way of example, in an irrigation system, if the flow rate is observed to decrease from irrigation cycle to irrigation cycle, this may indicate that the filter 56 may be getting clogged with debris. For example, if the normal flow rate through the flow sensor 10 is 20 gpm and the flow rate has dropped to 16 gpm over a period time (e.g., a few days) this may be an indication that debris in the filter 56 is inhibiting fluid to pass through the filter 56 and flow downstream. In this case, the needle 160 could be pointing to the first red area 26 (FIG. 1). Also, if a sprinkler is leaking water, such as when a nozzle 160 is removed from a pop-up sprinkler, the needle 160 could be pointing to the second red area 30 (FIG. 1), indicating too much flow.

In operation, fluid flows into the flow sensor 10 through the inlet passage 46. As the flow increases, the fluid moves the piston 78 upwards in the lower and upper chambers 52, 54. The piston 78 causes the needle 160 to rotate and indicate a condition, such as the flow rate through the flow sensor 10. That is, the upward movement of the piston 78 against the first spring 80 causes the twisted shaft 144 to turn and twist in the upper chamber 54. The twisting of the twisted shaft 144 converts linear motion of the piston 78 to rotational motion through the coupler 116 that then rotates the needle 160 about the gauge plate 186, indicating the flow through the flow sensor 10. As the flow sensor 10 is measuring the flow rate, the fluid flows around the piston head 76 of the piston 78 and through the tubular portion 50 and the flow guide 58. Next, the flow proceeds through the mesh screen 90 of the filter 56 to the outlet passage 48. The outlet passage 48 may include a regulator 16 to control the flow that continues downstream.

The piston 78, first spring 80, twisted shaft 144, tubular portion 50 and flow guide 58 are coordinated to measure flow through the flow sensor 10. Since the piston head 76 of the piston 78 has a constant diameter, the radial distance between a perimeter of the piston head 76 and the flow guide 54 increases as the piston head 76 rises in the tubular upper portion 70 of the flow guide 58. This enables the flow meter 20 to have a reduced overall length (or height) when compared to a constant diameter flow guide. More specifically, in general, higher velocities mean a higher force on the piston head 76 of the piston 78. For an expanding area, such as that provided by the conical tapered wall 72 of the upper tubular portion 70 of the flow guide 58, the velocity will decrease over the length for a given flow rate. So, at higher flow rates, the piston head 76 will be located in the upper tubular portion 70 with a larger cross-sectional area and, therefore, have a lower velocity. The advantage is that the flow meter can be shorter for the same flow rate range, and there will be a lower pressure drop.

The foregoing is illustrated by the following examples. In a first example, the frusto-conical portion of the flow guide has an inlet diameter of 1.25 in., an outlet diameter of 1.60 in., and an axial length of 2.45 in. The piston head has a diameter of 1.20 in., and the spring rate is 0.80 lb/in. In operation, the following table shows the position of the piston head from start of the frusto-conical portion and the spring displacement for 5.0 gpm and 25.0 gpm flow rates.

| Flow Rate (gpm) | Piston Head Position From Start (in.) | Spring Displacement (in.) |
| --- | --- | --- |
| 5.0 | 0.19 | 0.19 |
| 25.0 | 2.05 | 2.05 |

For a second example for comparison, a straight flow guide has a diameter of 1.25 in. The piston head has a diameter of 1.20 in. and a spring rate of 0.80 lbs/in. In operation, the following table shows the spring displacement for 5.0 gpm and 25.0 gpm flow rates.

| Flow Rate (gpm) | Spring Displacement (in.) |
| --- | --- |
| 5.0 | 0.19 |
| 25.0 | 4.78 |

The comparison of the spring displacements demonstrates that the frusto-conical portion can be much shorter than a straight flow guide. For a flow rate of 25.0 gpm, the conical housing has a spring displacement of 2.05 in. versus 4.78 in. for the straight housing.

Additionally, the combined flow guide/filter body 60 formed by the integration of the flow guide 58 into the filter 56 allows for simple manufacturing of a flow guide system coupled with a filter to prevent clogging and damage to the irrigation system. It also provides the ability to retrofit existing filter bodies to become both a filter and a flow sensor. One can simply do this by removing the filter top and the filter. Then, the combined filter and flow guide is inserted into the body. The filter cap is replaced with a new cap assembly that includes the flow meter 20 assembled as a single unit.

As with previous embodiments, the springs and shafts of the flow sensors can be made of metal, such as stainless steel. The other components of the flow sensors can be made of plastic, such as acrylonitrile butadiene styrene (ABS), polymethyl methacrylate (PMMA), polypropylene (PP), and polyamides (PA).

Additional details of flow sensors can be found in U.S. Application Nos. 62/361,873, filed Jul. 13, 2016, 62/427,675, filed Nov. 29, 2016, Ser. No. 15/649,332, filed Jul. 13, 2017, and Ser. No. 15/792,273, filed Oct. 24, 2017, all of the foregoing applications are incorporated by reference as if fully set forth herein.

The matter set forth in the foregoing description and accompanying drawings is offered by way of illustration only and not as a limitation. While particular embodiments have been shown and described, it will be apparent to those skilled in the art that modifications may be made without departing from the broader aspects of the technological contribution. The actual scope of the protection sought is intended to be defined in the following claims.

What is claimed is:

1. A flow sensor comprising:
    a body;
    a gauge associated with the body, the gauge including first fluid characteristic indicia and an indicator that moves relative to the first fluid characteristic indicia to indicate a current fluid characteristic; and
    a second fluid characteristic indicator associated with the gauge to provide further information based on the first fluid characteristic indicia and a current fluid characteristic and being moveable relative to the first fluid characteristic indicia upon disengagement of a lock intermediate the second fluid characteristic indicator and the body,
    wherein the second fluid characteristic indicator includes a dial rotatable about the gauge, and
    wherein the dial and the body being interconnected using at least one socket and at least one tab received in the at least one socket.

2. The flow sensor of claim 1 wherein the at least one tab includes a rib and the at least one socket includes an inside surface that can engage to prevent separation of the dial from the body.

3. The flow sensor of claim 1 wherein the at least one tab and the at least one socket include opposing projections that inter-engage one another when the dial is unlocked to provide a tacit feedback of travel.

4. The flow sensor of claim 1 wherein the body includes the at least one tab, and the at least one tab includes a plurality of sockets.

5. The flow sensor of claim 4 further comprising a dial ring, the dial ring including a plurality of tabs, each tab being received in one of the plurality of sockets.

6. The flow sensor of claim 5 wherein the dial ring includes a first set of serrations and the body includes a second set of serrations and the first and second set of serrations inter-engage to prohibit rotation of the dial ring.

7. The flow sensor of claim 6 wherein the dial attaches to the dial ring and is rotatable about the dial ring when the lock is disengaged.

* * * * *